INVENTOR.
ERNST R. SCHICKLE
BY
ATTORNEY

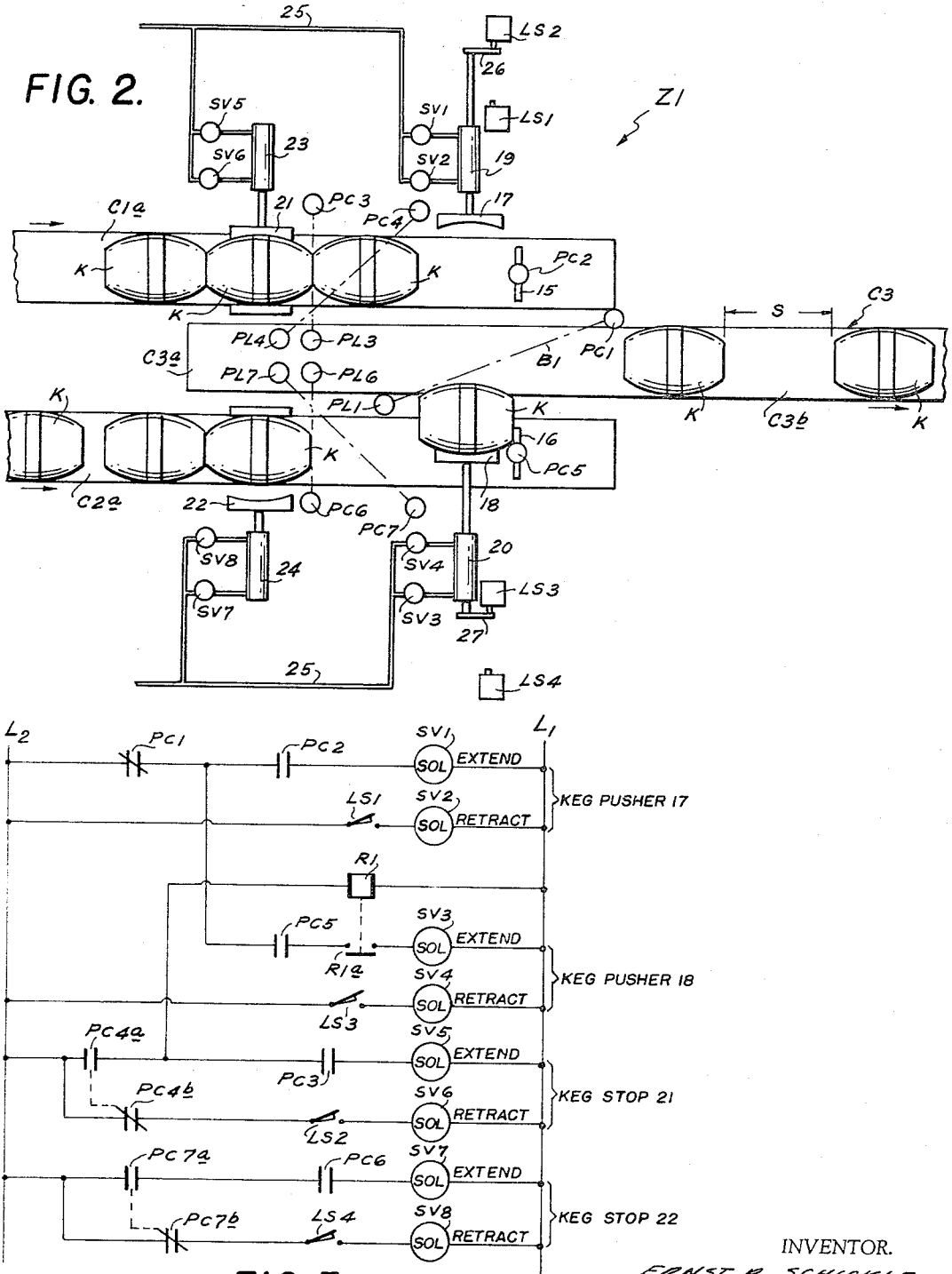
FIG. 2.
FIG. 3.
INVENTOR.
ERNST R. SCHICKLE
BY 
ATTORNEY

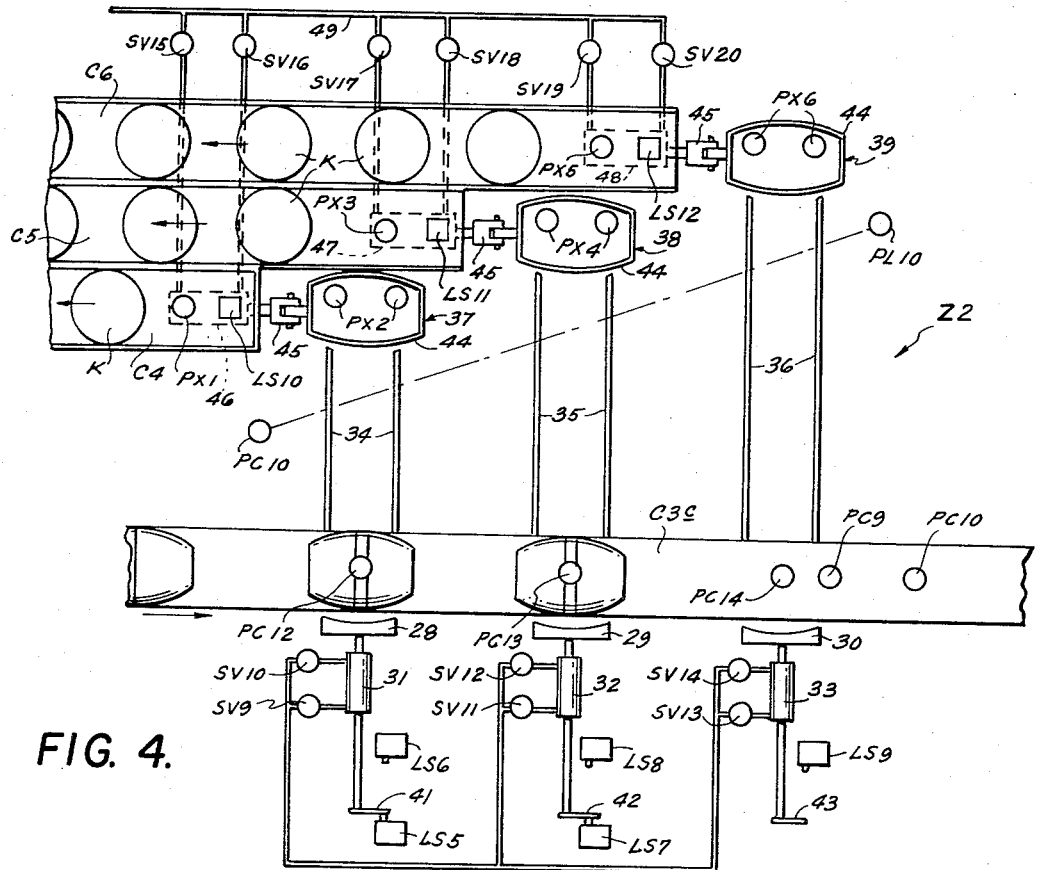
FIG. 4.
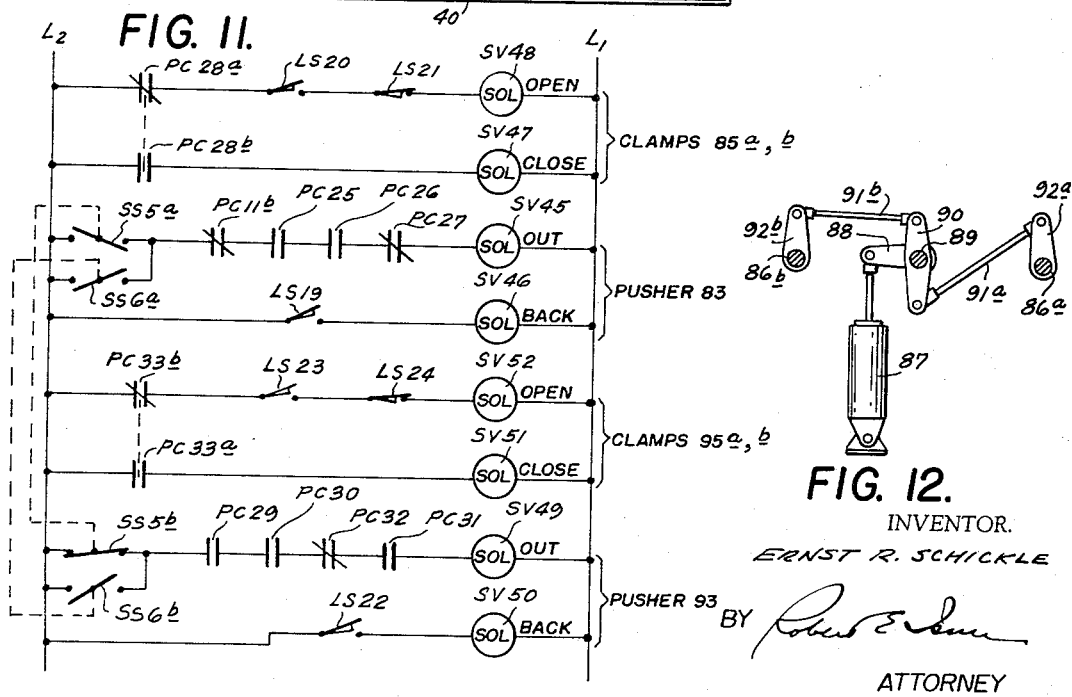
FIG. 11.
FIG. 12.
INVENTOR.
ERNST R. SCHICKLE
BY
ATTORNEY Feb. 27, 1968   E. R. SCHICKLE   3,370,720
KEG HANDLING SYSTEM
Filed Feb. 11, 1966   8 Sheets-Sheet 5

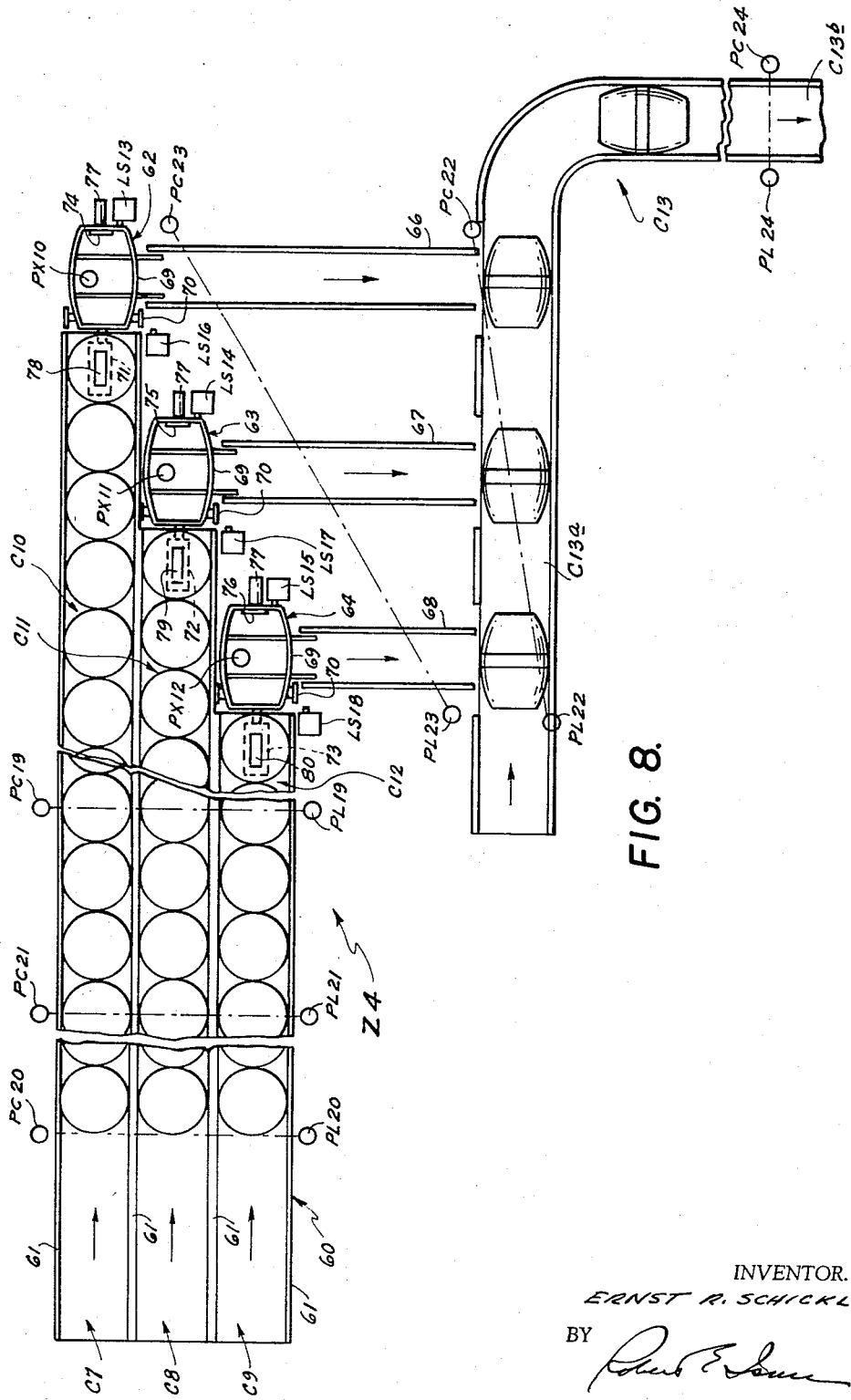

United States Patent Office 3,370,720
Patented Feb. 27, 1968

3,370,720
KEG HANDLING SYSTEM
Ernst R. Schickle, Tappan, N.Y., assignor to Rheingold Breweries, Inc., Brooklyn, N.Y., a corporation of New York
Filed Feb. 11, 1966, Ser. No. 526,784
18 Claims. (Cl. 214—16)

This invention relates generally to a system for handling beer kegs or barrels in a brewery.

Since kegs for draught beer are relatively costly, the empty kegs are returned to the brewery and there washed or cleaned prior to being refilled with beer for distribution to taverns and the like. In order to maintain the sterility of the kegs, the cleaned kegs cannot be stored, but rather must be conveyed directly from the washing apparatus to the rackers at which the kegs are filled. Thus, the efficient utilization of the washing apparatus and the rackers requires that, during the filling of kegs, there be available to the keg washing apparatus a continuously adequate supply of empty kegs to permit the operation of the washing apparatus at its optimum capacity which corresponds substantially to the rate at which the cleaned kegs can be filled by the rackers. However, the delivery trucks return the empty kegs in varying quantities to the brewery during limited and random time periods and such trucks must be unloaded, reloaded with filled kegs and moved from the loading docks or bays as quickly as possible. Thus, the random times during which varying quantities of empty kegs are returned to the brewery cannot be correlated with the necessary continuous keg washing and refilling operations so that, at certain periods, it is necessary to store varying quantities of the empty kegs as they are returned, and thereafter to remove empty kegs from storage in order to maintain a continuously adequate supply thereof to the washing apparatus. Due to the number and bulk of the kegs involved, such storage and handling of the empty kegs give rise to very serious problems, as concerns the operating expenses of the brewery.

Accordingly, it is an object of this invention to provide an efficient automated system for handling empty kegs returned to the brewery, and for continuously maintaining an adequate supply of such empty kegs at the keg washing apparatus so as to permit continuity of operation of the latter at its optimum rate.

Another object is to provide a keg handling system which, during the period when empty kegs in excess of the demand of the washing apparatus are returned to the brewery, accumulates those excess kegs in convenient groupings for storage and, thereafter, or whenever the demand for kegs at the washing apparatus exceeds the rate at which returned kegs are being conveyed thereto, is effective to separate individual kegs from groupings thereof removed from storage and to convey the same in succession to the washing apparatus so as to permit continuity of operation of the latter.

A further object is to provide a keg handling system of the described character which transports or conveys the kegs in a prone position, that is, with each keg lying on its side so as to facilitate the movement and handling thereof, and which disposes each keg to be stored in an erect position, that is, standing on an end thereof, so as to require the smallest possible floor space for the storage of the groupings of empty kegs and further to facilitate the stacking thereof, until such time as the empty kegs are required to satisfy the demand of the washing apparatus.

Still another object is to provide a keg handling system of the described character which requires a minimum of supervision of its operation, but which is nevertheless extremely flexible so as to be capable of satisfying the varying requirements and exigencies of brewery operation.

In accordance with an aspect of this invention, a brewery having a number of docks or bays constituting stations at which empty beer kegs are unloaded from trucks or the like returning the kegs to the brewery is provided with conveyor means moving past the unloading stations for receiving the returned empty kegs and having a terminus adjacent the apparatus for washing the kegs prior to the racking thereof, means operative when there is a predetermined excess of kegs on a section of the conveyor means leading to its terminus to effect removal of kegs from the conveyor means in advance of such section, grouping means receiving the kegs removed from the conveyor means and accumulating the removed kegs in convenient groupings for storage thereof, for example, in groups of twelve kegs arranged in three equal rows, degrouping means for receiving such groupings of kegs from storage and being operable to separate individual kegs from the groupings thereof, an auxiliary conveyor receiving the separated kegs from the degrouping means and conveying such kegs in succession, and keg distributing means operative, when there is an inadequate supply of kegs on the section of the conveyor means leading to its terminus, to transfer successive kegs from the auxiliary conveyor to said section of the conveyor means, thereby to continuously maintain an adequate supply of empty kegs to the keg washing apparatus.

In accordance with another feature of this invention, the kegs are disposed in prone positions on the conveyor means, and the system for handling the kegs in the brewery further comprises upending means operative to dispose the kegs removed from the conveyor means in erect positions for the accumulation thereof in the groupings convenient for storage, and down-ending means operative on the kegs separated from the groupings to return the kegs from their erect positions to prone positions on the auxiliary conveyor.

In accordance with still another feature of this invention, the auxiliary conveyor for transporting the kegs removed from storage extends to a second keg washing apparatus for supplying kegs thereto, and there is provided second keg distributing means operative to transfer kegs to the auxiliary conveyor from the terminal section of the conveyor means leading to the first washing apparatus, and control means for the second keg distributing means effecting operation thereof when more than an adequate supply of kegs for the first mentioned washing apparatus is present on the terminal section of the conveyor means leading thereto and there is an inadequate supply of kegs for the second washing apparatus on the auxiliary conveyor.

A further advantageous feature of a keg handling system in accordance with a preferred embodiment of the invention resides in the provision of such system with a plurality of keg receiving conveyors each moving past a respective number of the unloading stations for receiving empty kegs returned at such stations and having substantially parallel adjacent terminal sections from between which a main conveyor extends to the washing apparatus, and transfer means operative to transfer kegs alternatively from the terminal sections of the keg receiving conveyors onto the main conveyor with at least a predetermined spacing between the successive kegs transferred to the main conveyor. By reason of the foregoing arrangement, a photoelectric or other keg detecting means disposed adjacent the section of the main conveyor leading to the washing apparatus will be only intermittently affected by the spaced apart kegs on the main conveyor so long as there is only an adequate supply of kegs being advanced to the washing apparatus. However, when an excess supply of kegs is advanced to the washing apparatus, such kegs will back-up on the main conveyor so as to eliminate the spacing between the successive kegs, and the absence of spacing between the successive kegs will be sensed by the keg detecting means to actuate a suitable control circuit for effecting the removal of kegs from the main conveyor and the accumulation of the removed kegs in suitable groupings for the storage thereof.

The above, and other objects, features and advantages of this invention, will be apparent in the following detailed description of an illustrative embodiment thereof which is to be read in connection with the accompanying drawings forming a part hereof, and wherein:

FIG. 2 is a schematic view illustrating a portion of the keg handling system by which kegs received by two conveyors moving past the unloading docks or bays are alternatively transferred from the keg receiving conveyors onto a main conveyor for further movement through the keg handling system;

FIG. 3 is a schematic wiring diagram of the controls associated with the arrangement shown on FIG. 2;

FIG. 4 is a schematic view of a portion of the system by which the kegs transported by the main conveyor may be removed from the latter and disposed in erect position;

FIG. 8 is a schematic view of a portion of the system by which groupings of kegs removed from storage are separated into individual kegs and down-ended or disposed in prone positions on an auxiliary conveyor;

FIG. 11 is a schematic wiring diagram of the controls associated with the distributing devices shown on FIG. 10; and FIG. 12 is a detail view showing an arrangement for actuating keg clamps in one of the distributing devices.

Figure 1:
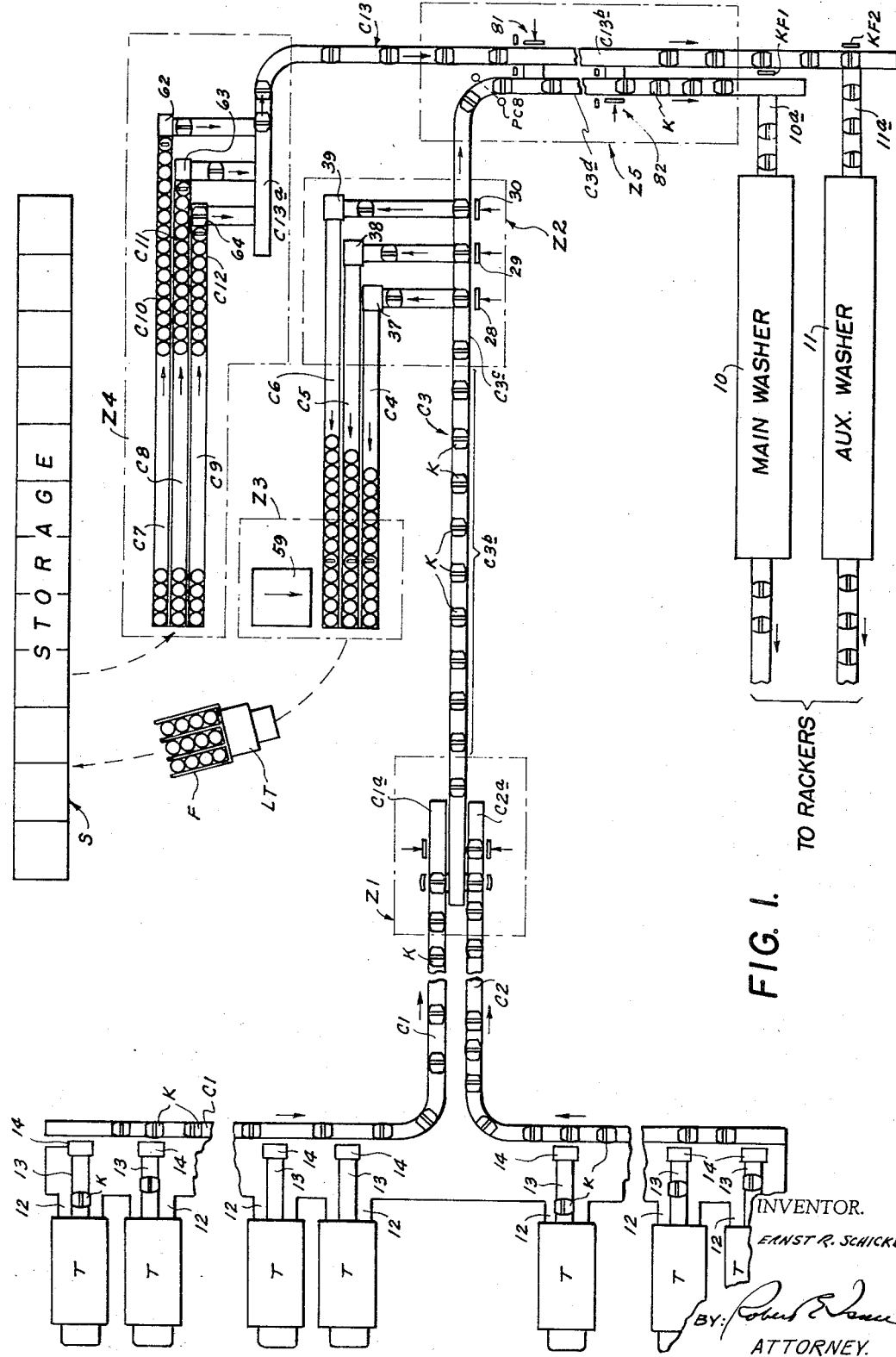
FIG. 1 is a diagrammatic view illustrating the movement of kegs in a brewery by a keg handling system embodying this invention.

Referring to the drawings in detail, it will be seen that the keg handling system embodying this invention, as schematically illustrated on FIG. 1, is provided for handling empty kegs K returned to a brewery by trucks T or other conveyances, and for continuously maintaining an adequate supply of such empty kegs at the inlet to a main keg washing apparatus 10 which may be automatically controlled for feeding cleaned kegs from its outlet to rackers (not shown) at which the cleaned kegs are filled. As shown, the keg handling system may also or alternatively supply empty kegs to the inlet of an auxiliary keg washing apparatus 11 which may be manually controlled to supply additional clean kegs, when required, to the rackers.

The empty kegs returned to the brewery by trucks T are unloaded from the latter at a number of docks or bays 12, for example, by being manually placed on unloading conveyors 13 which may be constituted by inclined rails extending from the body of the truck and are maintained in spaced relation to cooperate with the tapering ends and enlarged central cylindrical portion of conventional metal beer kegs, thereby to laterally contain and guide each keg as it rolls, under the influence of gravity, toward the lower end of the rails. At the lower or discharge end of each unloading conveyor 13, the successively unloaded kegs are received by an automatic keg feeder generally indicated at 14 and which may be of the type disclosed in detail in the application for U.S. Letters Patent Serial No. 456,187, filed May 17, 1965, by Ernst Schickle, now Patent No. 3,317,025. Each such automatic keg feeder 14 is operative to effect the one-at-a-time transfer of kegs from the releated unloading conveyor 13 to available spaces on a keg receiving conveyor moving past a number of the unloading docks or bays 12. In the keg handling system shown on FIG. 1, there are provided two keg receiving conveyors C1 and C2 moving toward each other past respective groups of the unloading bays or docks and turning substantially at right angles so as to transport the kegs in the same direction along parallel paths having adjacent terminal sections C1a and C2a at a transfer or merging zone Z1. The kegs K, when transferred to the receiving conveyors C1 and C2 are in prone positions thereon and have their axes extending in the direction of movement of the respective conveyor.

At the transfer zone Z1, the two lines of empty kegs transported by conveyors C1 and C2 are merged into a single line of kegs transported by a main conveyor C3 which has an initial section C3a interposed between terminal sections C1a and C2a of the keg receiving conveyors at the transfer or merging zone Z1.

In order to avoid unduly obstructing the floor space within the brewery, keg receiving conveyors C1 and C2 and initial section C3a of the main conveyor are preferably disposed below floor level, for example, in suitable tunnels roofed over by removable floor sections to permit access to the conveyors when it is necessary to repair or otherwise service the same.

Referring now to FIG. 2, it will be seen that, at transfer or merging zone Z1, abutments 15 and 16 are provided adjacent the ends of terminal conveyor sections C1a and C2a to limit the movement of the kegs first in line on such conveyor sections. Disposed adjacent the abutments 15 and 16 and operable on the kegs engaging the latter are keg pushing devices 17 and 18 which are movable from a retracted position, in which pushing device 17 is shown, to an extended position, in which pushing device 18 is shown, for example, by means of fluid pressure operated cylinders 19 and 20 having their rams respectively connected to the keg pushing devices 17 and 18.

When keg pushing device 17 or 18 is in its retracted position, it is withdrawn from the path of travel of the kegs on the respective conveyor section C1a or C2a so that the keg first in line thereon can move against abutment 15 or 16. However, when keg pushing device 17 or 18 is moved to its extended position, such device acts laterally against a keg stopped by the abutment 15 or 16 so as to laterally roll or push the keg from conveyor section C1a or C2a onto the adjacent section C3a of the main conveyor.

The terminal conveyor sections C1a and C2a are further provided, at the transfer or merging zone Z1, with keg stops or clamps 21 and 22, respectively, which are movable between an open or retracted position, as shown in the case of the stop 22, and an extended or closed position, as shown in the case of the stop 21. The stops 21 and 22 are moved between their extended and retracted positions by means of fluid pressure operated cylinders 23 and 24, respectively. The keg stops 21 and 22 are disposed at locations along the respective conveyor sections C1a and C2a which are in advance of the keg pushing devices 17 and 18, so as to be operable upon kegs which are second in line on the respective conveyor sections.

The purpose of keg stops 21 and 22 is to stop the keg second in line on the respective conveyor section while the keg first in line on such conveyor section continues to move toward the abutment 15 or 16, thereby to provide a space between the first and second kegs, and a control system is provided, as hereinafter described in detail, to effect the synchronous operation of the keg pushing devices 17 and 18 and of the associated keg clamps or stops so that kegs carried to zone Z1 by conveyors C1 and C2 are more or less alternately transferred therefrom onto main conveyor C3 with at least a predetermined space or distance S being provided between the adjacent kegs transferred onto the main conveyor.

As shown on FIG. 2, the supplying of compressed air or other fluid under pressure from supply lines 25 to the opposite ends of cylinders 19 and 20 is controlled by solenoid valves SV1 and SV2 and by solenoid valves SV3 and SV4. Similarly, the supplying of compressed air to the opposite ends of cylinders 23 and 24 is controlled by solenoid valves SV5 and SV6 and by solenoid valves SV7 and SV8. The valves SV1, SV3, SV5 and SV7 are effective, when energized, to move the respective keg pushing devices 17 and 18 and keg stops 21 and 22 to their extended positions, and the valves SV2, SV4, SV6 and SV8 are effective, when energized, to supply compressed air to the respective cylinders in the directions for returning the keg pushing devices 17 and 18 and the keg stops 21 and 22 to their retracted positions.

Referring now to the schematic wiring diagram of FIG. 3, it will be seen that the circuit for energizing solenoid valve SV1 has interposed therein photocells PC1 and PC2 respectively acting as a normally closed switch and a normally open switch connected in series with solenoid valve SV1. In referring to photocell PC1 as constituting a normally closed switch, it is meant that the contacts controlled by such photocell are closed so long as a beam of light aimed thereat is not interrupted by a keg on the respective conveyor, and that such contacts are open when a keg on the conveyor interrupts the light beam. Conversely, in referring to the photocell PC2 as constituting a normally open switch, it is meant that the contacts controlled by such photocell are open so long as a beam of light aimed thereat is not interrupted by a keg on the respective conveyor, and that the contacts controlled by photocell PC2 are closed when a keg interrupts the beam of light. Throughout this description, the designations of the several photocells as constituting either normally closed or normally open switches are intended to have the foregoing meanings.

As shown on FIG. 2, the photocell PC1 is disposed adjacent one side of initial section C3a of the main conveyor and has a beam of light B1 aimed thereat from a suitable light source PL1 which is disposed at the opposite side of the main conveyor and spaced substantially from photocell PC1 in the direction along the main conveyor so that the light beam B1 extends diagonally across the main conveyor along a substantial length of the latter between keg pushing devices 17 and 18. Thus, the switch constituted by photocell PC1 remains closed only when there is a free space on the main conveyor extending a substantial distance along the latter between pushing devices 17 and 18, that is, when the keg K previously transferred onto the main conveyor has been moved by the latter a substantial distance from between pushing devices 17 and 18.

Further, as shown on FIG. 2, photocell PC2 is located adjacent abutment 15 so that a light beam aimed at photocell PC2 from a suitable light source (not shown) is interrupted only when the first keg in line on conveyor section C1a is moved against abutment 15. Accordingly, solenoid valve SV1 is energized to cause movement of pushing device 17 to its extended position only when a keg previously transferred onto the main conveyor has been moved by the latter out of light beam B1 so that the switch constituted by photocell PC1 is closed, and when the keg first in line on conveyor section C1a has been moved against abutment 15 to cause closing of the switch constituted by photocell PC2, whereby the keg first in line on conveyor section C1a is transferred onto the main conveyor C3.

When a keg is thus transferred from conveyor section C1a onto the main conveyor, the transferred keg initially interrupts light beam B1 and thereby causes opening of the switch constituted by photocell PC1 so that solenoid valve SV1 is again deenergized. Further upon the movement of pushing device 17 to its extended position for transferring a keg, a switch actuator 26, which may be mounted on the ram of cylinder 19, as shown, so as to be movable with pushing device 17, engages a normally open limit switch LS1 so as to close the latter. As shown on FIG. 3, limit switch LS1 is connected in series with solenoid valve SV2 in the energizing circuit for the latter so that, upon closing of limit switch LS1, solenoid valve SV2 is energized to effect the return of keg pushing device 17 to its retracted position.

A light source PL3 (FIG. 2) directs a light beam laterally across conveyor section C1a toward a photocell PC3 which is disposed so that such light beam is intercepted by the leading end of a keg moved to the location of keg stop 21 by conveyor section C1a. Further, a light source PL4 disposed at one side of conveyor section C1a directs a light beam diagonally across that conveyor section to a photocell PC4 so that such light beam is intercepted by a keg being moved from the located of keg stop 21 to the location of keg pushing device 17. As shown in FIG. 3, photocell PC3 constitutes a normally open switch and is connected in series with normally open switch contacts PC4a of photocell PC4 in the energizing circuit for solenoid valve SV5 so that the latter is energized to extend keg stop 21 only when the keg first in line on conveyor secion C1a moving from keg stop 21 toward keg pushing device 17 and the keg second in line on that conveyor section has arrived at the location of keg stop 21 so as to be halted by the latter, as shown on FIG. 2.

As shown on FIG. 3, photocell PC4 further has normally closed contacts PC4b connected in series with a normally open limit switch LS2 in the energizing circuit of solenoid valve SV6. Normally open limit switch LS2 is mounted so as to be engaged by switch actuator 26, and thereby closed, when keg pushing device 17 is returned to its retracted position. Thus, solenoid valve SV6 is energized to return key stop 21 to its retracted postion for releasing the keg held thereby and permitting movement of the keg toward key pushing device 17 only when the latter is in its retracted position and the portion of conveyor section C1a scanned by photocell PC4, that is, the area between keg stop 21 and pushing device 17, it cleared.

As shown on FIG. 3, the energizing circuit for solenoid valve SV3 has interposed in series therein the normally closed switch constituted by photocell PC1, a normally open switch constituted by a photocell PC5, and the normally open contacts R1a of a relay R1. The relay R1 is connected in series with the normally open contacts PC4a of photocell PC4 so as to be energized for closing its contacts R1a only when a keg is being moved by conveyor section C1a from the location of key stop 21 toward keg pushing device 17. Photocell PC5 is mounted (FIG. 2) so that a light beam aimed thereat by a light source (not shown) is intercepted by the first keg in line on conveyor section C2a when such keg engages abutment 16, that is, arrives at the location of keg pushing device 18.

By reason of the above described energizing circuit for solenoid valve SV3, the latter is energized to cause extension of pushing device 18, and thereby to transfer the key first in line on conveyor section C2a from the latter to main conveyor C3, only if a keg is disposed against abutment 16 and simultaneously the area of main conveyor C3 scanned by photocell PC1 is clear of kegs and there is a keg moving on conveyor section C1a from keg stop 21 toward keg pushing device 17 so as to be detected by photocell PC4. Thus, a keg cannot be transferred from conveyor section C2a onto main conveyor C3 when the keg first in line on conveyor section C1a is located at pushing device 17 for transfer by the latter onto main conveyor C3. The foregoing ensures that pushing devices 17 and 18 will not be operated simultaneously to transfer kegs onto the same empty space on main conveyor C3, and further gives preference to the transfer of kegs onto the main conveyor from terminal section C1a of keg receiving conveyor C1. Since preference is given to the transfer of kegs from keg receiving conveyor C1 to main conveyor C3, receiving conveyor C1 preferably extends past a greater number of unloading locks or bays 12 than does the other receiving conveyor C2, and thus receives the unloaded kegs at a greater rate than conveyor C2.

The return of keg pushing device 18 to its retracted position is effected upon closing of a normally open limit switch LS3 interposed in the energizing circuit of solenoid valve SV4. As shown on FIG. 2, limit switch LS3 is mounted so that, when keg pushing device 18 is in its fully extended position, as shown, a switch actuator 27 movable with the ram of cylinder 20 engages and thereby closes limit switch LS3.

As shown on FIG. 3, the energizing circuit for solenoid valve SV7 has connected in series with the latter a normally open switch constituted by a photocell PC6 and normally open contacts PC7a of a photocell PC7. A light source PL6 (FIG. 2) directs a beam of light laterally across conveyor section C2a toward photocell PC6 so that such beam of light is interrupted by the leading end of a keg arriving at the location of keg stop 22. Further, a light source PL7 directs a beam of light diagonally across conveyor section C2a to photocell PC7 so that such beam of light will be interrupted by a keg moving from the location of keg stop 22 towards keg pushing device 18. Accordingly, solenoid valve SV7 is energized to extend keg stop 22 and thereby hold a keg at the location of such keg stop only if a keg first in line on conveyor section C2a is moving from keg stop 22 toward keg pushing device 18 at the time when the keg second in line on that conveyor section arrives at the location of keg stop 22.

The circuit for energizing solenoid valve SV8, and thereby retracting keg stop 22 to permit movement of a keg from the location of keg stop 22 toward keg pushing device 18, has connected in series therein normally closed contacts PC7b of photocell PC7 and a normally open limit switch LS4 (FIG. 3). As shown on FIG. 2, limit switch LS4 mounted so as to be engaged by switch actuator 27, and thereby closed, upon the return of keg pushing device 18 to its retracted position. Thus, keg stop 22 is retracted only if the portion of conveyor section C2a between keg stop 22 and keg pushing device 18 is clear of kegs and, simultaneously, keg pushing device 18 is in its retracted position.

As main conveyor C3 moves out of transfer or merging zone Z1, it carries the single line of kegs spaced apart thereon by at least the distance S along an upwardly inclined section C3b of the main conveyor so as to bring the kegs from below to above the floor level of the brewery. The inclined conveyor section C3b leads into an elevated section C3c of the main conveyor which travels through a zone Z2 at which kegs carried by the main conveyor in excess of those required to maintain an adequate supply at the inlets to the main washing apparatus 10 and/or the auxiliary washing apparatus 11 are removed from the main conveyor for storage thereof, as hereinafter described in detail.

As shown particularly on FIG. 4, kegs may be removed from the elevated conveyor section C3c in zone Z2 by a plurality of keg removing devices, for example, the three devices 28, 29 and 30 disposed at spaced apart locations along conveyor section C3c. The devices 28, 29 and 30 are movable, as by fluid pressure operated cylinders 31, 32 and 33, respectively, between normally retracted positions, as shown, and extended positions at which the keg removing devices are operative to laterally kick or push adjacently disposed kegs off main conveyor section C3c and onto downwardly inlined conveyor rails 34, 35 and 36 which are of progressively increasing lengths and lead to an echelon arrangement of keg up-ending devices 37, 38 and 39, respectively.

The supplying of compressed air or other fluid under pressure from supply line 40 to the opposite ends of cylinders 31, 32 and 33 is controlled by solenoid valves SV9 and SV10, by solenoid valves SV11 and SV12, and by solenoid valves SV13 and SV14, respectively. The valves SV9, SV11 and SV13 are effective, when energized, to move the respective keg removing devices 28, 29 and 30 to their extended or operative positions, and the valves SV10, SV12 and SV14 are effective, when energized, to return the keg removing devices 28, 29 and 30 to their retracted or inoperative positions.

It is intended that the devices 28, 29 and 30 be operated to remove successive kegs from conveyor section C3c when an excess supply or number of kegs is present on the following terminal section C3d of the main conveyor leading to the inlet of main washing apparatus 10. The presence of such an excess of kegs on terminal conveyor section C3d is detected by a photocell PC8 (FIGS. 1 and 10) disposed near the head or beginning of conveyor section C3d and toward which a beam of light is aimed diagonally across such conveyor section from a light source PL8. As shown on FIG. 5, photocell PC8 constitutes a normally open switch which is intermittently closed in response to the interruption of the light beam from source PL8 by spaced apart kegs moving on conveyor section C3d. However, if the rate at which kegs are removed from the terminus of conveyor section C3d and fed to the inlet 10a of washing apparatus 10 by a keg feeder KF1 (FIG. 10) is less than the rate at which kegs are advanced from conveyor section C3c onto conveyor section C3d, the spacing between successive kegs on conveyor section C3d is progressively eliminated back to the location of photocell PC8. Such elimination of the spacing between successive kegs causes continuous interruption of the light beam from source PL8 so as to effect closing of the switch constituted by photocell PC8 for an extended period. Closing of the switch constituted by photocell PC8 for an extended period is indicative of the presence of an excess number of kegs backed up along the terminal section C3d of the main conveyor.

Figure 5:
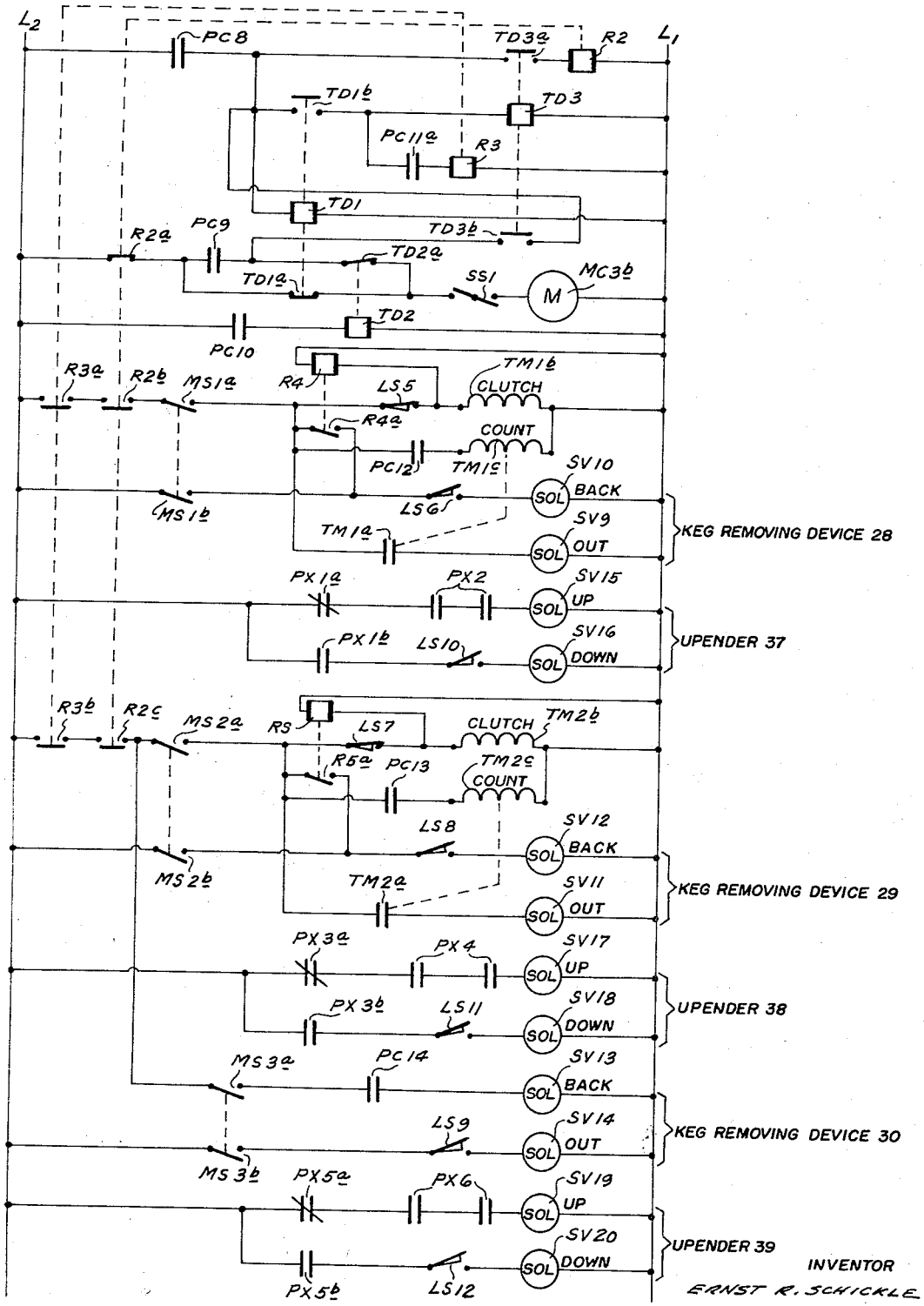
FIG. 5 is a schematic wiring diagram of the controls associated with the arrangement of FIG. 4.

As shown on FIG. 5, the normally open switch constituted by photocell PC8 is connected in series with the coil of a time delay relay TD1 in the energizing circuit for the latter. So long as the switch constituted by photocell PC8 is only intermittently closed, time delay relay TD1 does not trip, but closing of the switch constituted by photocell PC8 for a predetermined extended period causes tripping of time delay relay TD1 for opening a normally closed contact TD1a and closing a normally open contact TD1b of such relay. The normally closed contact TD1a is interposed, in series with a normally closed contact R2a of a relay R2 and a manually closed switch SS1, in an energizing circuit for a motor MC3b for driving the inclined section C3b of the main conveyor by which kegs are transported to the conveyor section C3c in keg removing zone Z2. The circuit for energizing motor MC3b further has, connected across contact TD1a, a normally open switch constituted by a photocell PC9 in series with a normally closed contact TD2a of a time delay relay TD2. As shown on FIG. 4, photocell PC9 is disposed adjacent conveyor section C3c at the downstream side of keg removing device 30 so that a keg moving beyond device 30 will interrupt the light beam directed at photocell PC9 by a light source (not shown) and thereby close the normally open switch constituted by photocell PC9. Returning to FIG. 5, it will be seen that the energizing circuit for time delay relay TD2 includes, in series with the coil of the latter, a normally open switch constituted by a photocell PC10. As shown on FIG. 4, a beam of light extending across the discharge or lower ends of all of the inclined conveyors 34, 35 and 36 is directed at photocell PC10 by a light source PL10. Thus, if the kegs removed from conveyor section C3a jam on any one of the inclined conveyors 34, 35 and 36, and thereby continuously interrupt the beam of light directed at photocell PC10, the continuous closing of the switch constituted by that photocell will cause energizing of time delay relay TD2 for a period sufficient to trip the latter and thereby open its normally closed contact TD2a.

It will be apparent that, when time delay relay TD1 trips to open contact TD1a, an alternate circuit for energizing motor MC3b is provided so long as photocell PC9 detects a keg leaving the location of keg removing device 30, and so long as time delay relay TD2 has not been tripped in response to the detection by photocell PC10 of a jam at the discharge end of one or more of the inclined conveyors 34, 35 and 36.

The closing of contact TD1b of time delay relay TD1 completes a circuit (FIG. 5) through the then closed switch constituted by photocell PC8 for energizing a time delay relay TD3 having normally open contacts TD3a and TD3b. Contact TD3a is interposed in series with the switch constituted by photocell PC8 in the energizing circuit for relay R2 so that, when time delay relay TD3 is tripped or times out, relay R2 is energized to open its normally closed contact R2a in the energizing circuit of motor MC3b, and to close its normally open contacts R2b and R2c. Contact TD3b of time delay relay TD3 is interposed in series with the switch constituted by photocell PC8 and the normally closed contact TD2a of time delay relay TD2 in an alternative circuit for energizing conveyor motor MC3b when relay contact R2a is open, as described above.

From the above it will be apparent that motor MC3b will continue to operate to cause inclined conveyor section C3b to feed kegs to elevated conveyor section C3c even through an excess number of kegs is present on the terminal conveyor section C3d, and that such feeding of kegs by the inclined conveyor section C3b is halted only when photocell PC10 detects a jam or other failure to remove kegs from the discharge ends of inclined conveyors 34, 35 and 36.

A photocell PC11 having a normally open switch contact PC11a is disposed adjacent conveyor section C3c at a location downstream with respect to photocell PC9 so that a light beam directed at photocell PC11 by a light source (not shown) is interrupted by kegs moving on conveyor section C3c toward conveyor section C3d, thereby to close the switch contact PC11a. As shown on FIG. 5, the switch contact PC11a is interposed in series with the switch constituted by photocell PC8 and time delay relay contact TD1b in an energizing circuit for a relay R3. Thus, when photocell PC11 detects a keg during the presence of an excess number of kegs already on terminal conveyor section C3d, relay R3 is energized to close its normally open contacts R3a and R3b which are connected in series with the previously mentioned contacts R2b and R2c, respectively, of relay R2.

The simultaneous closing of relay contacts R2b and R3a and of relay contacts R2c and R3b, as described above, conditions the control circuits of keg removing devices 28, 29 and 30 for effecting operation thereof.

As shown on FIG. 5, the energizing circuit for solenoid valve SV9 of keg removing device 28 has interposed therein a normally open timer switch TM1a in series with relay contacts R2b and R3a and with a manually closed switch MS1a. Also connected in series with relay contacts R2b and R3a and switch MS1a are a normally closed limit switch LS5 and a coil TM1b for engaging the return clutch of the timer that includes switch TM1a. Further, a stepping or counting coil TM1c of the timer in series with a photocell PC12 constituting a normally open switch are connected across limit switch LS5 and clutch engaging coil TM1b. As shown on FIG. 4, limit switch LS5 is mounted so as to be engaged, and thereby opened by a switch actuator 41 when cylinder 31 disposes keg removing device 28 in its retracted or inoperative position. Further, photocell PC12 is mounted adjacent conveyor section C3c at the location of keg removing device 28 so that, as each keg moved by that conveyor section arrives at the location of keg removing device 28, such keg interrupts a beam of light directed at photocell PC12 by a light source (not shown) and thereby closes the switch constitued by photocell PC12.

So long as key removing device 28 is in its retracted position, and thus causes opening of limit switch LS5, clutch coil TM1b is deenergized. Further, the timer associated with the energizing circuit for solenoid valve SV9 is arranged so that timer switch TM1a is closed to energize that solenoid valve, and thereby cause movement of keg removing device 28 from its retracted position to its extended position only upon three successive impulses to counting or stepping coil TM1c as a result of the interruption of the light beam aimed at photocell PC12 by three successive kegs carried by conveyor section C3c. Thus, after the circuit for energizing solenoid valve SV9 is conditioned for operation in response to the presence of an excess number of kegs on terminal conveyor section C3d, the first and second kegs carried by conveyor section C3c past keg removing device 28 will continue along the latter conveyor section, and only the third keg arriving at keg removing device 28 will be laterally kicked or pushed by such device for removal from conveyor section C3c. When keg removing device 28 is moved from its retracted to its extended position for removing a keg from conveyor section C3c, limit switch LS5 will return to its normal closed position to cause energization of clutch coil TM1b which effects return of the timer to its initial or start position and thereby opens timer switch TM1a so that solenoid valve SV9 is deenergized. In order to ensure the full return of the timer to its initial or start position even if one or both of relay contacts R2b and R3a opens prior to the completion of such return, an alternative circuit for energizing clutch coil TM1b is provided through a manually closed switch MS1b coupled with switch MS1a and through a normally open relay contact R4a in series with limit switch LS5. The circuit for energizing relay R4, and thereby closing its contacts R4a, is connected across clutch coil TM1b so that the initiation of energization of clutch coil TM1b, as described above, also initiates energization of relay R4 which is thereafter maintained in its energized condition through the closing of relay contact R4a until limit switch LS5 is again open in response to the return of keg removing device 28 to its retracted position.

The circuit for energizing solenoid valve SV10, and thereby causing return of keg removing device 28 to its retracted position has connected in series therein manually closed switch MS1b and a normally open limit switch LS6 which, as shown on FIG. 4, is mounted so as to be engaged by switch actuator 41 and thereby closed upon movement of keg removing device 28 to its extended or operative position.

As shown on FIG. 5, the control circuits for keg removing device 29 are generally similar to those described above for keg removing device 28 and include a normally open timer switch TM2a and manually closed switch MS2a connected in series with relay contacts R2c and R3b in the energizing circuit of solenoid valve SV11; a clutch coil TM2b which is energized to return the timer to its initial or start position upon closing of a limit switch LS7 in response to the release of such limit switch by a switch actuator 42 (FIG. 4) when keg removing device 29 is moved from its retracted position to its operative or extended position; and a stepping coil TM2c connected in series with a normally open switch constituted by a photocell PC13 and with relay contacts R2c and R3b and manually closed switch MS2a. The timer associated with the circuit for energizing solenoid valve SV11 differs from that associated with solenoid valve SV9, as described above, only in that timer switch TM2a is closed to effect removal from conveyor section C3c of the second keg arriving at the location of keg removing device 29 to close the switch constituted by photocell PC13 after the detection of the presence of an excess number of kegs on the terminal conveyor section C3d. When keg removing device 29 is moved from its retracted position toward its operative position, the return or reset clutch coil TM2b is energized through closed limit switch LS7 which also causes energization of the relay R5 for closing contact R5a of the latter and thereby maintaining energization of the reset clutch coil and of relay R5 through the circuit having manually closed switch MS2b, relay contact R5a and limit switch LS7 in series therein until limit switch LS7 is again opened upon the return of keg removing device 29 to its retracted position. Keg removing device 29 is returned to its retracted position when a normally open limit switch LS8 in series with the manually closed switch MS2b in the energizing circuit for solenoid valve SV12 is closed by switch actuator 42 in response to the arrival of keg removing device 29 at its extended position.

The control circuits for keg removing device 30 are shown to include a manually closed switch MS3a and a normally open switch constituted by a phototcell PC14 connected in series with relay contacts R2c and R3b in the energizing circuit for solenoid valve SV13. Photocell PC14 is mounted adjacent keg removing device 30 (FIG. 4) so that a keg carried by conveyor section C3c and arriving at the location of device 30 will intercept a light beam directed at photocell PC14 by a light source (not shown) and thereby effect closing of the switch constituted by photocell PC14. Thus, after an excess of kegs has been detected on terminal conveyor section C3d, the next keg arriving at the location of keg removing device 30 causes energization of solenoid valve SV13 so that keg removing device 30 laterally kicks or pushes such keg off conveyor section C3c onto inclined conveyor 36. As soon as the keg has been thus removed from conveyor C3c, the light beam aimed at photocell PC14 is again uninterrupted so that the switch constituted by photocell PC14 will open and cause deenergization of solenoid valve SV13.

The circuit for energizing solenoid valve SV14 includes a manually closed switch MS3b in series with a normally open limit switch LS9 which is closed by a switch actuator 43 in response to the movement of keg removing device 30 to its fully extended position, whereupon the energized solenoid valve SV14 causes return of keg removing device 30 to its retracted position.

It will be apparent that, by reason of the above described control circuits for keg removing devices 28, 29 and 30, the detection of an excess number of kegs on terminal conveyor section C3d will cause the first keg which thereafter arrives at keg removing device 28 to be kicked off conveyor section C3c by device 30, the second keg which arrives at keg removing device 28 to be kicked off conveyor section C3c by device 29, and the third keg which arrives at device 28 to be kicked by the latter off conveyor section C3c.

When the congestion or presence of an excess number of kegs on terminal conveyor section C3d is relieved so that the switch constituted by photocell PC8 is no longer continuously closed, relay R2 is deenergized to open its contacts R2b and R2c and thereby prevent further operation of keg removing devices 28, 29 and 30. If such opening of the switch constituted by photocell PC8 occurs prior to the completion of the sequential operation of keg removing devices 30, 29 and 28, in that order, the timer of each keg removing device which has not yet operated does not return to its initial or start position. Thus, when congestion or an excess number of kegs on terminal conveyor section C3d again occurs, the cycle of operation of keg removing devices 30, 29 and 28 will commence at the point where it was previously interrupted. Accordingly, if, for example, the congestion of kegs on terminal conveyor section C3d is relieved after only two kegs have been removed from conveyor section C3c by devices 30 and 29, the next occurrence of congestion on terminal conveyor section C3d will cause keg removing device 28 to be the first of the keg removing devices operated for removing a keg from conveyor section C3c. It will be understood that, so long as the congestion or presence of an excess number of kegs on terminal conveyor section C3d continues, keg removing devices 30, 29 and 28 will be repeatedly operated, in the order described, so as to effect removal of kegs from conveyor section C3c.

The upending devices 37, 38 and 39 may be of the type disclosed in detail in co-pending application for U.S. Letters Patent Serial No. 526,768 of even date herewith, now Patent No. 3,301,380 and are operative to transfer the kegs received in prone positions from inclined conveyors 34, 35 and 36, respectively, to erect positions on parallel assembling conveyors C4, C5 and C6, respectively. As generally shown in FIG. 4, each of the upending devices 37, 38 and 39 includes a cradle 44 which is pivotally mounted adjacent one end, as at 45, for swinging movement between a horizontal position, as shown, at which the upwardly opening cradle is disposed adjacent the discharge end of the related downwardly inclined conveyor 34, 35 or 36 to receive a keg rolling down the latter, and a vertical or erect position, at which the cradle 44 is disposed vertically adjacent the inlet end of the related assembling conveyor C4, C5 or C6 so as to deposit the keg in an erect position on such assembling conveyor.

The cradles 44 of upending devices 37, 38 and 39 are moved between their horizontal keg receiving and vertical keg delivering positions by means of fluid pressure operated cylinders 46, 47 and 48 indicated in broken lines on FIG. 4 and having their rams suitably connected to the pivotally mounted cradles of the respective upending devices. The supplying of fluid under pressure from a supply line 49 to the opposite ends of cylinders 46, 47 and 48 is controlled by solenoid valves SV15 and SV16, by solenoid valves SV17 and SV18 and by solenoid valves SV19 and SV20, respectively. The arrangement is such that energizing of any one of the solenoid valves SV15, SV17 or SV19 causes movement of the cradle 44 of the related upending device to its erect delivery position, whereas energizing of any of solenoid valves SV16, SV18 or SV20 causes movement of cradle 44 of the related upending device to its horizontal keg receiving position.

Referring now to FIG. 5, it will be seen that the circuit for energizing solenoid valve SV15 has interposed in series therein a normally closed contact PX1a of a proximity switch PX1 and two normally open proximity switches PX2. The circuit for energizing solenoid valve SV16 has interposed in series therein a normally open contact PX1b of proximity switch PX1 and a normally open limit switch LS10. As shown on FIG. 4, proximity switch PX1 is mounted at the portion of accumulating conveyor C4 onto which a keg is delivered by upending device 37 and is operative, when a keg is detected on that portion of the conveyor, to open its normally closed contact PX1a and to close its normally open contact PX1b. Proximity switches PX2 are shown to be mounted at spaced locations in the cradle 44 of upending device 37 so as to be both affected, and thereby closed, when a keg discharged from inclined conveyor 34 into the cradle of device 37 is properly seated therein. The normally open limit switch LS10 is mounted so as to be engaged, and thereby closed, by the cradle 44 of device 37, or by any other structure moving therewith, when such cradle is in its erect or keg delivering position.

It will be apparent that, with the above described arrangement, the reception of a properly seated keg in the cradle 44 of device 37 while at its horizontal keg receiving position causes closing of both series connected proximity switches PX2 to complete the circuit for energizing solenoid valve SV15 so long as proximity switch contact PX1a remains closed to indicate that there is an available space on accumulating conveyor C4 to receive such keg. The energizing of solenoid valve SV15 causes swinging movement of the cradle 44 of device 37 to its erect position, whereby the keg is delivered in erect position onto conveyor C4 and carried by the latter out of the cradle. The movement of the cradle of device 37 to its erect position causes closing of limit switch LS10 so that, when proximity switch PX1 detects the presence of the delivered keg on conveyor C4, and thereby closes its contact PX1b, the circuit for energizing solenoid valve SV16 is completed to effect the return movement of cradle 44 of device 37 to its horizontal keg receiving position.

The circuits for controlling the operation of upending device 38 similarly include a proximity switch PX3 having a normally closed contact PX3a and a normally open contact PX3b and which detects the presence of a keg on accumulating conveyor C5 adjacent the infeed end of the latter, two normally open proximity switches PX4 mounted at spaced apart locations in cradle 44 of device 38 to detect the proper seating of a keg therein, and a normally open limit switch LS11 which is closed in response to the movement of the cradle of device 38 to its erect keg delivering position. As shown on FIG. 5, the normally closed proximity switch contact PX3a and the normally open proximity switches PX4 are interposed in series in the energizing circuit for solenoid valve SV17, and normally open proximity switch contact PX3b and normally open limit switch LS11 are interposed in series in the energizing circuit for solenoid valve SV18.

The control circuits for upending device 39 are also similar to those described above with reference to device 37 and include a proximity switch PX5 having a normally closed contact PX5a and a normally open contact PX5b and being mounted to detect the presence of a keg at the infeed end of accumulating conveyor C6, two normally open proximity switches PX6 mounted at spaced locations in the cradle 44 of device 39 to detect the proper seating of a keg in such cradle, and a normally open limit switch LS12 which is closed in response to the movement of the cradle of device 39 to its erect keg delivering position. As before, normally closed proximity switch contact PX5a and normally open proximity switches PX6 are interposed in series in the energizing circuit for solenoid valve SV19, and normally open proximity switch contact PX5b and normally open limit switch LS12 are interposed in series in the energizing circuit for solenoid valve SV20.

The above described control circuits for upending devices 38 and 39 operate in the same manner as has been described with respect to the upending device 37. Thus, upon the reception of a properly seated keg in the cradle 44 of device 38 or 39 disposed in its horizontal keg receiving position, the cradle is moved to its erect position to deliver the keg onto accumulating conveyor C5 or C6, whereupon the cradle is returned to its horizontal position for receiving the next keg removed from conveyor section C3c by the associated keg removing device 29 or 30.

Figure 6:
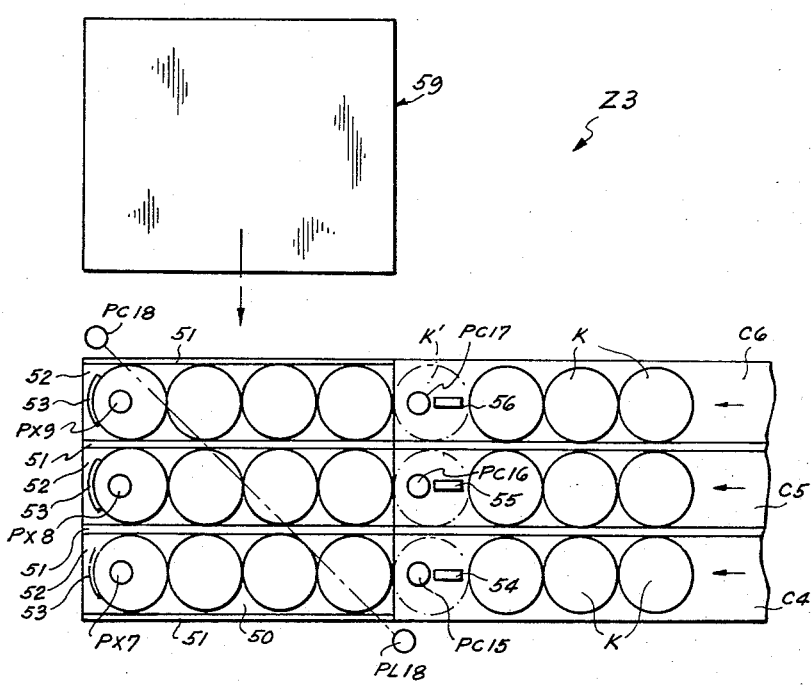
FIG. 6 is a schematic view of a portion of the system by which kegs removed from the main conveyor and up-ended or disposed in erect positions are accumulated in convenient groupings for the storage thereof.

The accumulating conveyors C4, C5 and C6 move the erect kegs deposited thereon in parallel paths extending to a grouping zone Z3. As shown on FIG. 6, at the grouping zone Z3, conveyors C4, C5 and C6 move the erect kegs onto an accumulating plate or table having laterally spaced guides 51 defining tracks 52 therebetween for arranging the kegs received from conveyors C4, C5 and C6 in three parallel rows on table 50. Where the groupings of kegs to be stored each include 12 kegs, as shown, table 50 has a length sufficient to accommodate four kegs in each of the tracks 51. At the end of each track 52 remote from the associated conveyor C4, C5 or C6, there is provided an upstanding stop 53 to limit the movement of the respective rows of kegs on table 50.

Since the kegs deposited on table 50 are not driven while on the latter, it will be apparent that the movement of such kegs along each track 52 toward the stop 53 is effected by the pressure thereagainst of succeeding kegs that are still disposed on, and driven by the related accumulating conveyor C4, C5 or C6. Thus, the leading keg in each of the rows of kegs deposited on table 50 moves against the stop 53 only when there are four kegs in that row on the accumulating table, and at least a fifth keg is disposed on the conveyor C4, C5 or C6, as indicated in broken lines at K', to effect the final movement of the leading keg against stop 53.

Figure 7:
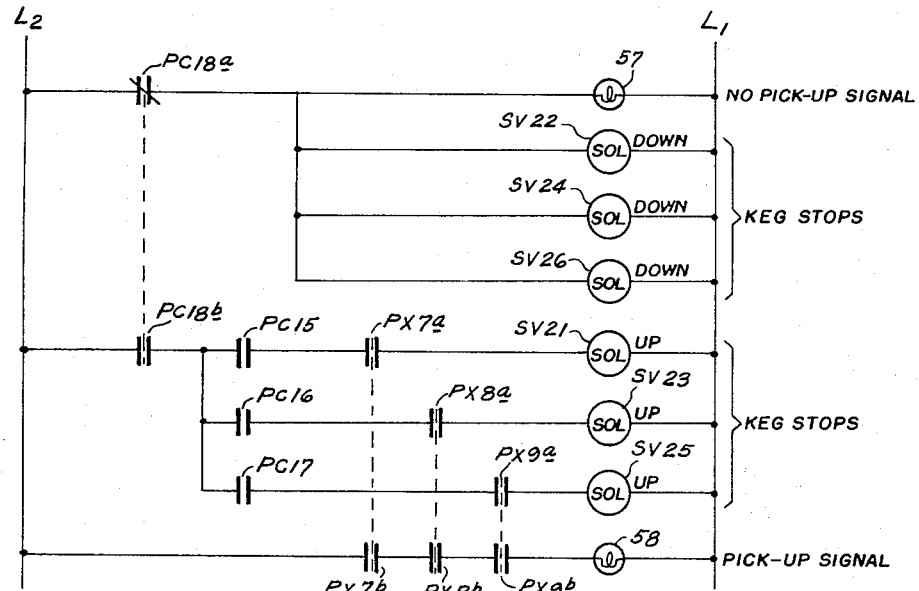
FIG. 7 is a schematic wiring diagram of the controls associated with the arrangement of FIG. 6.

The tracks 52 of table 50 leading from conveyors C4, C5 and C6 are provided with proximity switches PX7, PX8 and PX9, respectively, disposed adjacent the stops 53 so as to detect the presence of kegs against such stops by closing their normally open contacts PX7a and PX7b, PX8a and PX8b, and PX9a and PX9b (FIG. 7). Movable stops 54, 55 and 56 are disposed near the ends of conveyors C4, C5 and C6, respectively, adjacent table 50 and are movable vertically between a lowered or inoperative position, where such stops are withdrawn from the path of movement of kegs on the respective conveyors, and raised or operative positions where the stops 54, 55 and 56 act from below against the lower ends of the kegs indicated at K' so as to raise such kegs against an overhead abutment (not shown). Thus, raising of stops 54, 55 and 56 halts the movement of the kegs K' by conveyors C4, C5 and C6 and thereby relieves the accumulated kegs on table 50 from the pressure of the kegs K' thereagainst. The movements of the stops 54, 55 and 56 between their lowered inoperative positions and their raised operative positions may be effected by fluid pressure operated cylinders (not shown) to which compressed air or other fluid under pressure is supplied under the control of solenoid valves SV21 and SV22, solenoid valves SV23 and SV24, and solenoid valves S25 and SV26, respectively (FIG. 7). The arrangement is such that energization of solenoid valves SV21, SV23 or SV25 effects the upward movement of the respective stop 54, 55 or 56 to its operative position, whereas energizing of solenoid valve SV22, SV24 or SV26 is effective to return the related stop 54, 55 or 56 to its lowered or inoperative position.

The controls for the keg stops 54, 55 and 56 include, in addition to the previously mentioned proximity switches PX7, PX8 and PX9, photocells PC15, PC16 and PC17 acting as normally open switches, and being disposed at the ends of conveyors C4, C5 and C6 adjacent table 50 so that, whenever a keg is disposed at the position indicated in broken lines at K' on the respective conveyor, a beam of light aimed at photocell PC15, PC16 or PC17 is interrupted by the keg and thereby closes the switch constituted by such photocell. Further, a photocell PC18 is disposed adjacent one corner of table 50 (FIG. 6) and has a beam of light aimed thereat by a light source PL18 disposed at a diagonally opposed corner.

As shown on FIG. 7, photocell PC18 has a normally closed contact PC18a interposed in the energizing circuits for solenoid valves SV22, SV24 and SV26, and also in the energizing circuit for a signal lamp 57. Thus, so long as table 50 is cleared of kegs to permit photocell contact PC18a to remain in its normal closed position, solenoid valves SV22, SV24 and SV26 are energized to hold keg stops 54, 55 and 56 in their lowered inoperative positions, and lamp 57 is energized to indicate that there is no need to pick up a grouping of kegs from table 50. Photocell PC18 further has a normally open contact PC18b, which is in series with the switch constituted by photocell PC15 and proximity switch contact PX7a in the energizing circuit for solenoid SV21, in series with the switch constituted by photocell PC16 and proximity switch contact PX8a in the energizing circuit for solenoid valve SV23, and in series with the switch constituted by photocell PC17 and proximity switch contact PX9a in the energizing circuit for solenoid valve SV25. Thus, upon the completion of any row of kegs on table 25, the light beam aimed at photocell PC18 is interrupted to close contact PC18b and, simultaneously, the first keg in such complete row is detected by proximity switch PX7, PX8 or PX9 and the keg in the position K' on conveyor C4, C5 or C6 is detected by photocell PC15, PC16 or PC17, thereby to complete the circuit for energizing the solenoid SV21, SV23 or SV25 and causing the upward movement of the related stop 54, 55 or 56. When all of the rows of kegs on table 50 are complete, proximity switch contacts PX7b, PX8b and PX9b which are interposed in series in an energizing circuit for a signal lamp 58 (FIG. 7) are simultaneously closed to cause illumination of lamp 58 and thereby indicate to an operator that a full grouping of kegs has been assembled on table 50 and is to be transported from the table 50 to a suitable storage area.

When a grouping of kegs on table 50 has been completed, a slip board, for example, a suitably shaped piece of plywood, may be placed on top of the grouping of kegs either manually or by a suitable slip board dispenser which is only generally indicated at 59.

The removal of the complete grouping of kegs from table 50 to a suitable storage area indicated at S on FIG. 1 may be effected by a lift truck LT having a fork F with four times which are spaced apart to engage under the enlarged cylindrical central portions of the kegs in the three rows of the complete grouping. Since the kegs are erect in the grouping removed from table 50, such kegs will occupy a minimum space when placed in storage area S, and further make it possible to stack successive groupings of kegs one upon the other so as to minimize the floor area required for storage.

When the empty kegs being returned to the brewery and transported by receiving conveyors C1 and C2 to the main conveyor C3 are inadequate to satisfy the demand of main washing apparatus 10 and/or of auxiliary washing apparatus 11, or during a period when no empty kegs are being returned to the brewery, groupings of kegs may be removed from storage area S, for example, by the previously described lift truck LT, and placed on a degrouping table 60. Table 60 has parallel, spaced guides 61 defining three parallel tracks or paths along which the rows of kegs in each grouping placed thereon are transported by infeed conveyors C7, C8 and C9, and then by delivery conveyors C10, C11 and C12 which respectively terminate at downending devices 62, 63 and 64 arranged in echelon. The infeed conveyors C7, C8 and C9 are all driven by a motor MC7, 8, 9 (FIG. 9) having an energizing circuit in which a manually closed switch SS2 is connected in series with a photocell PC19 constituting a normally closed switch. An alternate circuit for energizing motor MC7, 8, 9 is provided through a normally open contact PC20a of a photocell PC20 and a normally closed switch constituted by a photocell PC21 which are in parallel with the switch constituted by photocell PC19. As shown on FIG. 8, photocell PC19 has a light beam aimed thereat across the table 60 from a light source PL19 and is located approximately midway between the ends of delivery conveyors C10, C11 and C12. Thus, the switch constituted by photocell PC19 completes the circuit for driving infeed conveyors C7, C8 and C9 and thereby causes kegs to be advanced onto the delivery conveyors whenever the kegs held in readiness on the latter for feeding to downending devices 62, 63 and 64 have been reduced below a predetermined number, that is, when the light beam aimed at photocell PC19 is not interrupted. Photocell PC21 also has a light beam aimed thereat laterally across table 60 from a light source PL21 and is spaced from photocell PC19 in the direction opposed to the movement of conveyors C10, C11 and C12 by a distance approximately equal to the space required on table 60 for each grouping of kegs. Photocell PC20 is located adjacent the infeed end of table 60 so that a light beam aimed laterally across the table at photocell PC20 by a light source PL20 is interrupted by the grouping of kegs removed from storage and placed on table 60, and such light beam is interrupted when an adequate space is available at the infeed end of table 60 to receive a new grouping of kegs.

By reason of the foregoing positioning and arrangement of photocells PC19, PC20 and PC21, infeed conveyors C7, C8 and C9 are driven to advance kegs thereon to delivery conveyors C10, C11 and C12, respectively, whenever photocell PC19 detects the reduction of the kegs on the delivery conveyors below a predetermined number, or whenever a new grouping of kegs is placed in the infeed end of table 60 so as to be detected by photocell PC20 and photocell PC21 simultaneously detects the presence of space on the delivery conveyors C10, C11 and C12 for receiving additional kegs from the related infeed conveyors.

Figure 9:
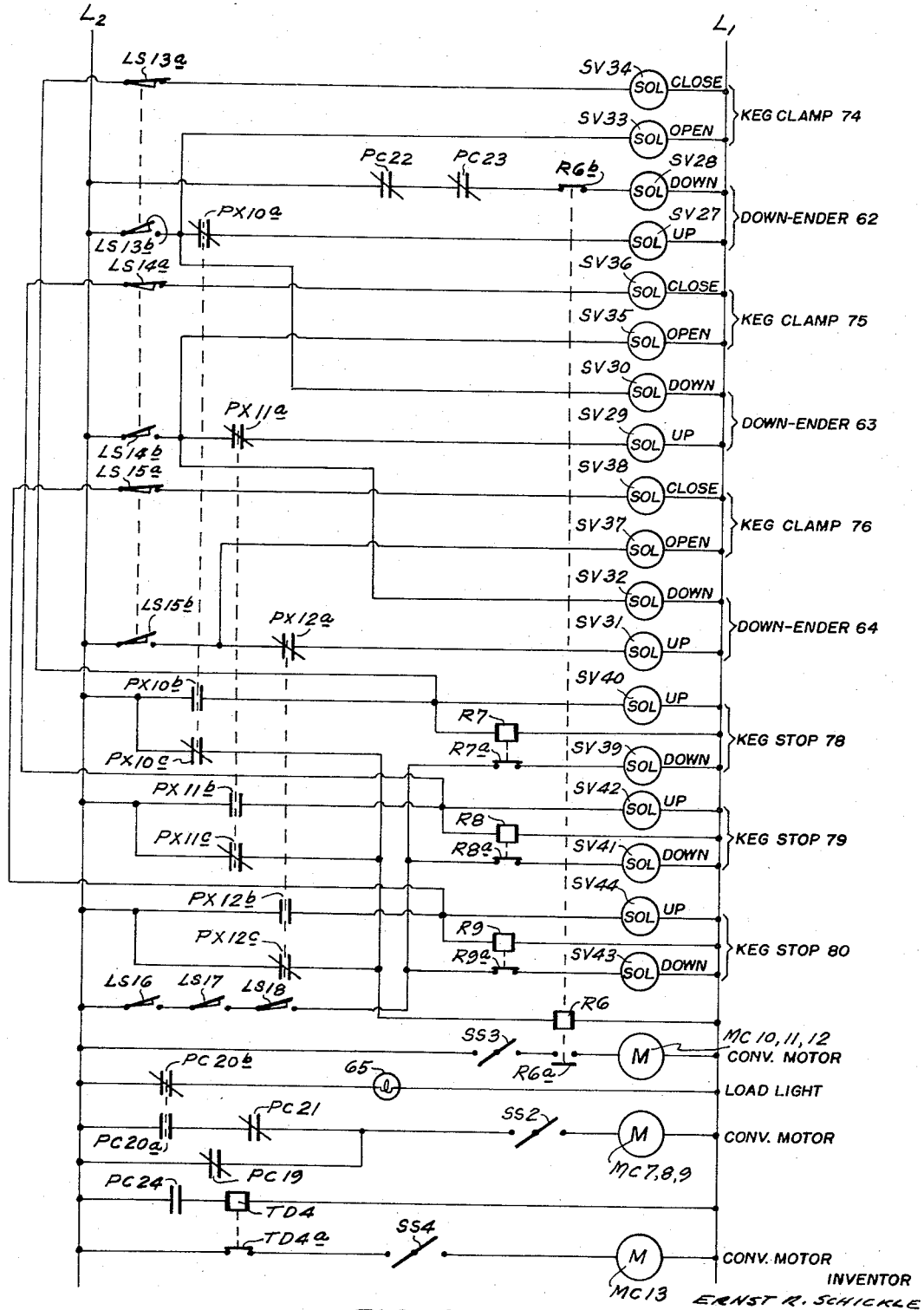
FIG. 9 is a schematic wiring diagram showing the controls associated with the arrangement of FIG. 8.

As shown on FIG. 9, photocell PC20 may be further provided with a normally closed contact PC20b interposed in an energizing circuit for a signal light 65 so that the latter is illuminated whenever the light beam aimed at photocell PC20 is not interrupted. Thus, illumination of signal light 65 indicates to the operator of lift truck LT that there is adequate space at the infeed end of table 60 for the reception of a grouping of kegs removed from storage.

The downending devices 62, 63 and 64 are operative to transfer the kegs first in line on conveyors C10, C11 and C12 from their erect positions on such conveyors into prone positions and to discharge the prone kegs by way of inclined conveyors 66, 67 and 68 onto a keg receiving section C13a of an auxiliary conveyor C13. Conveyor 13 further has a terminal section C13b running parallel to terminal section C3d of the main conveyor (FIGS. 1 and 10) and extending to a keg feeder KF2 for auxiliary washing apparatus 11.

In order to function in the foregoing manner, each of downending devices 62, 63 and 64 includes a cradle 69 pivotally mounted, as at 70, for swinging movement between a horizontal keg deliverying position, as shown, adjacent the upper end of the respective inclined conveyor 66, 67 or 68, and an erect or vertical position adjacent the end of the respective delivery conveyor C10, C11 or C12 at which the erect keg first in line on such conveyor can be pushed into the cradle. Swinging movements of pivoted cradles 69 of devices 62, 63 and 64 may be effected by fluid pressure operated cylinders 71, 72 and 73, respectively, which are schematically shown in broken lines on FIG. 8.

The supplying of compressed air or other fluid under pressure from a suitable supply line (not shown) to the opposite ends of cylinders 71, 72 and 73 is controlled by solenoid valves SV27 and SV28, by solenoid valves SV 29 and SV30, and by solenoid valves SV31 and SV32, respectively (FIG. 9). The arrangement is such that solenoid valves SV27, SV29 and SV31, when energized, cause movement of cradles 69 of devices 62, 63 and 64, respectively, to their vertical keg receiving positions. Conversely, energizing of solenoid valves SV28, SV30 and SV32 causes movement of the cradles of the respective devices 62, 63 and 64 to their horizontal keg delivering positions.

As shown on FIG. 8, cradles 69 of devices 62, 63 and 64 have proximity switches PX10, PX11 and PX12 respectively located therein so as to detect the presence of kegs in such cradles. The cradles of downending devices 62, 63 and 64 further have keg clamps 74, 75 and 76, respectively, carried by the ends of the cradles which are uppermost in the erect positions thereof and which are movable toward and away from the opposite or lower ends of the crandles between opened and closed positions at which the keg clamps are operative to release or clamp kegs disposed in the related cradles. Such movements of keg clamps 74, 75 and 76 may be effected by fluid pressure operated cylinders 77 (FIG. 8) under the control of solenoid valves SV33 and SV34, solenoid valves SV35 and SV36, and solenoid valves SV37 and SV38, respectively. The arrangement is such that keg clamps 74, 75 and 76 are moved to their closed or keg clamping positions in response to energizing of solenoid valves SV34, V36 and V38, respectively, and to their open or keg releasing positions in response to energizing of solenoid valves SV33, SV35 and SV37, respectively.

The downending devices 62, 63 and 64 are also provided with limit switches LS13, LS14 and LS15 which are actuated when the respective cradles 69 are in their horizontal or keg delivering positions, and with limit switches LS16, LS17 and LS18 which are actuated when the respective cradles are in their vertical or keg receiving positions.

As indicated on FIG. 8, the ends of delivery conveyors C10, C11 and C12 adjacent downending devices 62, 63 and 64 are provided with keg stops 78, 79 and 80 which are movable through the respective conveyors from lowered or inoperative positions to raised or operative positions at which kegs disposed thereabove on the respective conveyors are lifted from the latter and held tightly against overhead abutments (not shown). The keg stops 78, 79 and 80 may be moved between the foregoing inoperative and operative positions by means of fluid pressure operated cylinders (not shown) to which compressed air or other fluid under pressure is supplied from a suitable line under the control of solenoid valves SV39 and SV40, solenoid valves SV41 and SV42 and solenoid valves SV43 and SV44, respectively (FIG. 9). The arrangement is such that keg stops 78, 79 and 80 are moved downwardly to their inoperative positions upon energization of solenoid valves SV39, SV41 and SV43, respectively, and conversely, such keg stops are moved upwardly to their operative positions upon energizing of the solenoid valves SV40, SV42 and SV44, respectively.

As shown on FIG. 9, the circuit for energizing solenoid valve SV27 includes a normally open contact LS13b of limit switch LS13 in series with a normally closed contact PX10a of proximity switch PX10. Similarly, the circuit for energizing solenoid valve SV29 has in series therewith a normally open contact LS14b of limit switch LS14 and a normally closed contact PX11a of proximity switch PX11, and the circuit for energizing solenoid valve SV31 has in series therewith a normally open contact LS15b of limit switch LS15 and a normally closed contact PX12a of proximity switch PX12. Thus, each of solenoid valves SV27, SV29 and SV31 is energized to effect upward swinging movement of cradle 69 of the respective device 62, 63 or 64 to its erect or keg receiving position whenever the cradle is in its horizontal position to actuate limit switch LS13, LS14 or LS15 and the cradle is empty, that is, the proximity switch PX10, PX11 or PX12 does not detect a keg in the cradle.

The circuit for energizing the motor MC10, 11, 12 by which keg delivery conveyors C10, C11 and C12 are driven is shown to include a manually closed switch SS3 and a normally open contact R6a of a relay R6. In the circuit for energizing that relay R6, parallel, normally closed contacts PX10c, PX11c and PX12c of proximity switches PX10, PX11 and PX12, respectively, are shown connected in series with the relay so that the latter is energized to cause operation of conveyor motor MC10, 11, 12, when any one of the cradles is empty, as detected by the respective proximity switch.

The energizing circuits for solenoid valves SV39, SV41 and SV43 are shown to include normally closed relay contacts R7a, R8a and R9a, respectively, and also the normally open limit switches LS16, LS17 and LS18, in series. Thus, when cradles 69 of downending devices 62, 63 and 64 all arrive at their erect positions adjacent the ends of delivery conveyors C10, C11 and C12, respectively, and thereby close limit switches LS16, LS17 and LS18, solenoid valves SV39, SV41 and SV43 are energized to effect downward movement of keg stops 78, 79 and 80 to their inoperative positions. When the keg stops are moved to their inoperative or lowered positions, the kegs first in line on delivery conveyors C10, C11 and C12 are free to be advanced by the latter into the erect cradles of the downending devices.

The circuits for energizing solenoid valves SV40, SV42 and SV44 are shown to include normally open contacts PX10b, PX11b and PX12b of proximity switches PX10, PX11 and PX12, respectively. Thus, when the kegs first in line on delivery conveyors C10, C11 and C12 are advanced into the erect cradles 69 of devices 62, 63 and 64 and detected by proximity switches PX10, PX11 and PX12, contacts PX10b, PX11b and PX12b of the proximity switches are closed to energize solenoid valves SV40, SV42 and SV44 and thereby cause upward movement of keg stops 78, 79 and 80, respectively, thereby to hold the kegs next in line on the delivery conveyors against exerting continued pressure upon the kegs received in the erect cradles.

The coils of relays R7, R8 and R9 are seen to be connected in parallel with solenoid valves SV40, SV42 and SV44, respectively, so that, upon energization of such solenoid valves as described above, relays R7, R8 and R9 are also energized to open their contacts R7a, R8a and R9a and thereby halt energizing of the solenoid valves SV39, SV41 and SV43, respectively.

The energizing circuit for solenoid valve SV34 is shown to have a normally closed contact LS13a of limit switch LS13 and the normally open proximity switch contact PX10b interposed in series therein. Similarly, the energizing circuit of solenoid valve SV36 has a normally closed contact LS14a of limit switch LS14 and proximity switch contact PX11b interposed in series therein, and the energizing circuit for solenoid valve SV38 has a normally closed contact LS15a of limit switch LS15 and the normally open proximity switch contact PX12b interposed in series therein. Thus, solenoid valves SV34, SV36 and SV38 are energized to move keg clamps 74, 75 and 76, respectively, to their closed or clamping positions when the cradles 69 are moved to their erect positions so as to release limit switches LS13, LS14 and LS15, and the kegs first in line on conveyors C10, C11 and C12 are advanced into the erect cradles so as to be detected therein by the proximity switches PX10, PX11 and PX12.

As shown, the circuit for energizing solenoid valve SV28 includes, in series therein, a normally closed contact R6b of relay R6, and normally closed switches constituted by photocells PC22 and PC23. A beam of light is aimed at photocell PC22 by a light source PL22 (FIG. 8) so that such beam of light diagonally traverses the area on keg receiving section C13a of auxiliary conveyor C13 which extends across the discharge ends of inclined conveyors 66, 67 and 68. Thus, the switch constiuted by photocell PC22 will be closed only when no kegs are on the portion of conveyor section C13a traversed by the light beam directed at photocell PC22, that is, when there is a sufficiently clear space on conveyor section C13a to receive three spaced kegs from downending devices 62, 63 and 64. Further as shown on FIG. 8, a light beam is directed at photocell PC23 across all three conveyors 66, 67 and 68 from a light source PL23 so that such light beam will be interrupted to open the switch constituted by photocell PC23 and thereby prevent energizing of solenoid valve SV28 whenever there is a jam-up of kegs on any of inclined conveyors 66, 67 and 68. Energizing of solenoid valve SV28 is also prevented whenever relay R6 is energized to open its contact R6b by reason of the normal closing of any of proximity switch contacts PX10c, PX11c and PX12c.

However, when kegs have been advanced into all of the erect cradles to cause opening of all of the proximity switch contacts PX10c, PX11c and PX12c, and thereby deenergize relay R6 for closing contact R6b thereof, and assuming that the switches constituted by photocells PC22 and PC23 are both in their normally closed positions, solenoid valve SV28 is energized to cause swinging of cradle 69 of downending device 62 to its horizontal position.

As shown, normally open contact LS13b of limit switch LS13 is also interposed in the energizing circuit for solenoid valve SV33. Thus, when cradle 69 of downending device 62 arrives at its horizontal position and thus actuates limit switch LS13 to close contact LS13b thereof, solenoid valve SV33 is energized to move keg clamp 74 to its open position and thereby permit the keg to roll from the cradle of downending device 62 onto inclined conveyor 66 for discharge from the latter onto conveyor section C13a.

The energizing circuit for solenoid valve SV30 also has limit switch contact LS13b interposed therein so that, when limit switch LS13 is actuated to close its contact LS13b in response to the arrival of the cradle of downending device 62 at its horizontal position, solenoid valve SV30 is energized to cause downward swinging of the cradle of downending device 63 from its erect position to its horizontal position. Since the energizing circuit for solenoid valve SV35 has the normally open limit switch contact LS14b interposed therein, the arrival of cradle 69 of downending device 63 at its horizontal position and the consequent actuation of limit switch LS14 to close its contact LS14b causes energization of solenoid valve SV35. Such energizing of solenoid valve SV35 moves keg clamp 75 to its open or released position, and thereby permits the keg to roll from the horizontal cradle of downending device 63 onto inclined conveyor 67 for discharge from the latter onto conveyor section C13a.

Since limit switch contact LS14b is also interposed in the energizing circuit for solenoid valve SV32, the arrival of the cradle of downending device 63 at its horizontal position causes energizing of solenoid valve SV32 and thereby causes downward swinging of the cradle of downending device 64 from its erect position to its horizontal position. The arrival of cradle 69 of downending device 64 and the consequent actuation of limit switch LS15 causes closing of limit switch contact LS15b which is interposed in the energizing circuit for solenoid valve SV37. Thus, upon the arrival of the cradle of downending device 64 at its horizontal position, solenoid valve SV37 is energized to move keg clamp 76 to its open or released position and thereby permit the keg to roll from the horizontal cradle of downending device 64 onto inclined conveyor 68 for discharge therefrom onto conveyor section C13a.

As the keg rolls from the horizontal cradle of each of the downending devices 62, 63 and 64, the proximity switch contact PX10a, PX11a or PX12a is again closed for completing the energizing circuit of the solenoid valve SV27, SV29 or SV31. As each of valves SV27, SV29 and SV31 is energized, the related cradle is returned to its erect position adjacent the delivery conveyor C10, C11 or C12, whereupon the cycle of operation described above is repeated after the three kegs deposited on conveyor section C13a by the previous cycle of operation have been moved clear of the portion of that conveyor section scanned by photocell PC22. Thus, downending devices 62, 63 and 64 operate in sequence and repetitiously so long as auxiliary conveyor C13 is running to transfer successive kegs from erect positions on degrouping table 60 to prone positions on auxiliary conveyor C13. Since downending devices 62, 63 and 64 are operated in sequence and the inclined conveyors 66, 67 and 68 extending therefrom have their discharge ends spaced apart along conveyor section C13a, the successive kegs deposited in prone positions on conveyor section C13a are spaced apart on the latter by distances at least as great as the distances between conveyors 66 and 67 and conveyors 67 and 68.

Referring again to FIG. 9, it will be seen that the energizing circuit for a motor MC13 by which auxiliary conveyor C13 is driven has a manually closed switch SS4 and the normally closed contact TD4a of a time delay relay TD4 interposed in series therein. The energizing circuit for time delay relay TD4 includes a photocell PC24 constituting a normally open switch. As shown on FIGS. 8 and 10, photocell PC24 is disposed adjacent the head of terminal section C13b of the auxiliary conveyor and a beam of light is aimed laterally across conveyor section C13b at photocell PC24 by a light source PL24. Thus, the switch constituted by photocell PC24 is intermittently closed to only intermittently energize time delay relay TD4 so long as the kegs transported past photocell PC24 are spaced apart along conveyor C13. Such intermittent energizing of time delay relay TD4 does not cause tripping thereof. However, if the rate of removal of kegs from terminal section C13b of auxiliary conveyor C13 is less than the rate at which kegs are transferred to the auxiliary conveyor by downending devices 62, 63 and 64, kegs will tend to back-up or have the spacing therebetween progressively reduced until the beam of light aimed from source PL24 at photocell PC24 is continuously interrupted by the kegs to cause continuous closing of the switch constituted by photocell PC24. The resulting continuous energization of time delay relay TD4 will cause the latter to trip or open its contact TD4a, and thereby halt operation of motor MC13. The resulting stoppage of auxiliary conveyor C13 will cause one or more of the kegs previously delivered thereto by downending devices 62, 63 and 64 to remain in the section of the conveyor scanned by photocell PC22 and thereby prevent energization of solenoid valve SV28 for initiating the sequence of operation of the downending devices. Thus, the downending devices 62, 63 and 64 are repeatedly operated in sequence only so long as auxiliary conveyor C13 is continuously operated to remove kegs from the region of the discharge ends of inclined conveyors 66, 67 and 68.

Figure 10:
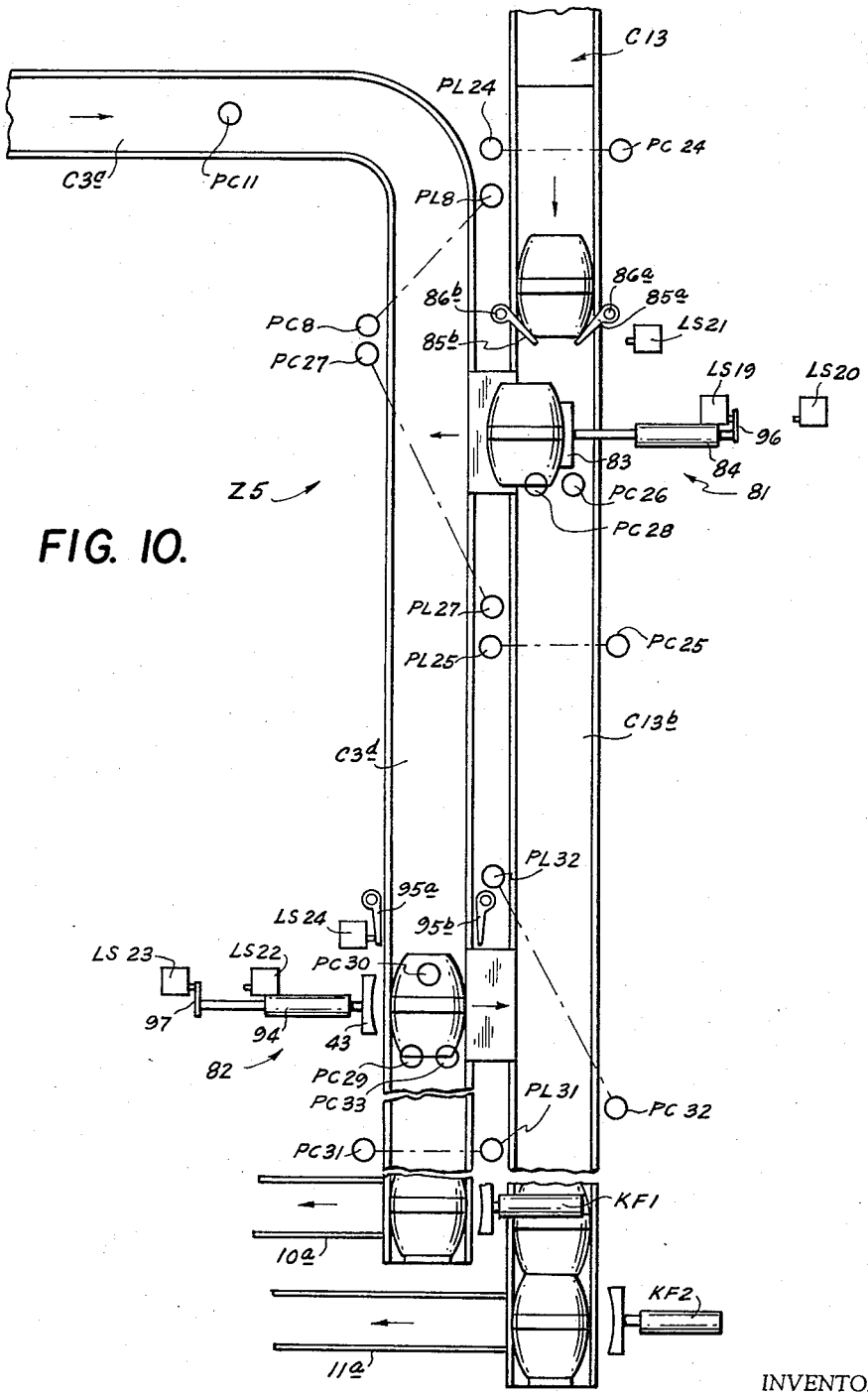
FIG. 10 is a schematic view of the terminal sections of the main conveyor and auxiliary conveyor respectively leading to a main washing apparatus and an auxiliary washing apparatus, and of keg distributing devices associated with the terminal sections of the conveyors for transferring kegs therebetween.

The keg handling system embodying this invention preferably provides for the selective or automatic transfer of kegs from auxiliary conveyor C13 to main conveyor C3, or from main conveyor C3 to auxiliary conveyor C13 as the kegs are transported by terminal conveyor sections C3d and C13b through a keg transferring zone Z5 (FIGS. 1 and 10). In order to effect such transfer of kegs between terminal conveyor sections C3d and C13b, the keg handling system is provided with a distributing device 81 located adjacent the head of terminal conveyor section C13b at the downstream side of photocell PC24, and with a distributing device 82 located adjacent terminal conveyor section C3d intermediate the ends of the latter.

As shown particularly on FIG. 10, distributing device 81 may include a keg pusher 83 which is movable from a retracted or inoperative position laterally across conveyor section C13b in the direction toward conveyor section C3d, for example, by means of a fluid pressure operated cylinder 84 having its ram suitably connected to pusher 83. When pusher 83 is in its retracted position, it is withdrawn from the path of travel of kegs on conveyor section 13b so that kegs on the latter can be transported past distributing device 81 for successive feeding by keg feeder KF2 to the inlet 11a of auxiliary washing apparatus 11. However, when pusher 83 is moved laterally across conveyor section C13b to its extended position, as shown, pusher 83 acts laterally against a keg then disposed on conveyor section C13b at the location of pusher 83 so as to laterally roll or push such keg from conveyor section C13b onto conveyor section C3d.

Distributing device 81 further includes clamps 85a and 85b mounted on vertical shafts 86a and and 86b, respectively, at the opposite sides of conveyor section C13b in advance of pusher 83, that is, at the upstream side of the latter. Turning of shafts 86a and 86b causes swinging movement of the clamps between operative or clamping positions, as shown, where clamps 85a and 85b project into the path of movement of kegs on conveyor section C13b to hold the keg which is next in line after the keg being acted upon by pusher 83, and inoperative or released positions where clamps 84a and 85b are withdrawn from the path of travel of kegs on conveyor section C13b. As shown on FIG. 12, the simultaneous movements of clamps 85a and 85b between their operative and inoperative positions may be effected by a fluid pressure operated cylinder 87 which is suitably mounted below conveyor section C13b and has its ram pivotally connected to a radial arm 88 secured on a vertical shaft rotatably supported between shafts 86a and 86b. A two armed lever 90 is also secured on shaft 89 and has its opposite ends pivotally connected to links 91a and 91b which are, in turn, pivotally connected to similarly directed arms 92a and 92b, respectively, secured on shafts 86a and 86b. By reason of the arrangement shown on FIG. 12, shafts 86a and 86b are turned in opposite directions in response to the extension or retraction of the ram of cylinder 87, thereby to move both clamps 85a and 85b to either their operative or inoperative positions.

As indicated on FIG. 11, the supplying of compressed air or other fluid under pressure to cylinder 84 from a suitable supply line is controlled by solenoid valves SV45 and SV46, with the arrangement being such that energization of solenoid valve SV45 causes movement of pusher 83 to its extended or operative position and energizing of solenoid valve SV46 effects return movement of pusher 83 to its retracted or inoperative position. Similarly, the supplying of fluid under pressure to cylinder 87 is controlled by solenoid valves SV47 and SV48, with the arrangement being such that energizing of solenoid valve SV47 causes movement of clamps 85a and 85b to their operative or closed positions and energizing of solenoid valve SV48 causes movement of the clamps to their open or inoperative positions.

The distributing device 82 is similar to the previously described distributing device 81 and includes a pusher 93 (FIG. 10) movable between an extended or operative position and a retracted or inoperative position by suitable connection to the ram of a fluid pressure operated cylinder 94, and keg clamps 95a and 95b disposed upstream with respect to pusher 93 and being movable between operative and inoperative positions by a fluid pressure operated cylinder (not shown). As indicated on FIG. 11, the supplying of fluid under pressure to cylinder 94 for moving pusher 93 is controlled by solenoid valves SV49 and SV50, with the arrangement being such that energizing of solenoid valve SV49 causes movement of pusher 93 to its operative or extended position and energizing of solenoid valve SV50 causes return movement of the pusher to its retracted or inoperative position. The supplying of fluid under pressure to the cylinder for moving clamps 95a and 95b is also under the control of solenoid valves SV51 and SV52, with the arrangement being such that energizing of solenoid valve SV51 effects movement of clamps 95a and 95b to their operative or closed position and energizing of solenoid valve SV52 causes return of the clamps to their open or inoperative positions.

The circuit for energizing solenoid valve SV45 has connected in series therein parallel, manually actuated selector switches SS5a and SS6a, a normally closed contact PC11b of photocell PC11, normally open switches constituted by photocells PC25 and PC26 and a normally closed switch constituted by a photocell PC27.

As indicated on FIG. 10, photocell PC26 is disposed so that the leading end of a keg arriving at the location of pusher 83 on conveyor section C13b will interrupt a beam of light directed at photocell PC26 by a light source (not shown). Photocell PC25 is spaced downstream from photocell PC26 by a distance greater than the length of each keg, but less than the normal distance between successive kegs as placed on auxiliary conveyor C13 by downending devices 62, 63 and 64. Thus, the switches constituted by photocells PC25 and PC26 are simultaneously closed to complete the circuit for energizing solenoid valve SV45 only if a keg arrives at the location of pusher 83 along conveyor section C13b so as to be detected by photocell PC26 at a time when the preceding kegs on conveyor section C13b have been backed-up or had the spacing therebetween eliminated so as to interrupt the beam of light aimed by light source PL25 at photocell PC25.

The photocell PC27 has a beam of light aimed thereat from a light source PL27 diagonally across the portion conveyor section C3d which is adjacent distributing device 81 so that the switch constituted by photocell PC27 remains in its closed position only so long as there is a clear space on conveyor section C3d to receive a keg transferred thereto from conveyor section C13b by pusher 83. As previously mentioned, photocell PC11 is at the downstream side of keg removing zone Z2 (FIG. 4) so that contact PC11b remains closed only so long as kegs are not being transported from conveyor section C3c to terminal conveyor section C3d.

By reason of the foregoing arrangements, solenoid valve SV45 can be energized to extend pusher 83 to its operative position for kicking or pushing a keg from conveyor section C13b of the auxiliary conveyor onto section C3d of the main conveyor only if such keg arrives at the location of pusher 83 at a time when preceding kegs are backed-up or congested on conveyor section C13b, there is a clear space to receive the transferred keg on conveyor section C3d, and no kegs are being transported from conveyor section C3c to terminal conveyor section C3d.

As shown on FIG. 11, the circuit for energizing solenoid valve SV46 includes a normally open limit switch LS19 which is engaged, and thereby closed by an actuator 96 upon movement of pusher 83 to its fully extended position. Thus, when pusher 83 is moved to its fully extended or operative position, limit switch LS19 is closed to energize solenoid valve SV46 and thereby cause the return movement of pusher 83 to its retracted or inoperative position.

The circuit for energizing solenoid valve SV48 is shown to include a normally closed switch contact PC28a of a photocell PC28, a normally open limit switch LS20 and a normally closed limit switch LS21 connected in series therein. As shown on FIG. 10, limit switch LS20 is mounted so as to be engaged, and thereby closed by switch actuator 96 upon return of pusher 83 to its retracted or inoperative position, and limit switch LS21 is mounted so as to be engaged by one of the clamps 85a and 85b or otherwise opened in response to movement of the clamps to their inoperative or open positions. Further, as shown, photocell PC28 is mounted so that the leading end of a keg arriving at the location of pusher 83 along conveyor section C13b will interrupt a beam of light aimed at photocell PC28 by a light source (not shown).

As shown on FIG. 11, the circuit for energizing solenoid valve SV47 has a normally open switch contact PC28b interposed therein. Thus, whenever a keg carried by conveyor section C13b arrives at the location of pusher 83, switch contact PC28b is closed to energize solenoid valve SV47 and thereby cause movement of clamps 85a and 85b to their closed or clamped position. If the keg detected by photocell PC28 is not transferred to conveyor section C3d by movement of pusher 83 to its operative or extended position, but rather continues along conveyor section C13b beyond photocell PC28, photocell contact PC28b is returned to its normally open position to deenergize solenoid valve SV47, and photocell contact PC28a is returned to its normally closed condition to energize solenoid valve SV48 through limit switch LS20 closed by actuator 96 and through limit switch LS21 which is in its normally closed condition. Energizing of solenoid valve SV48 causes return of clamps 85a and 85b to their open or inoperative positions, thereby to permit travel of the next keg beyond clamps 85a and 85b to the location of pusher 83. The return of the clamps to their open or inoperative positions causes opening of limit switch LS21, whereby to deenergize solenoid valve SV48.

If the keg arriving at the location of pusher 83 to cause closing of photocell contact PC28b for energizing solenoid valve SV47 and thereby moving clamps 85a and 85b to their closed positions is transferred by pusher 83 from conveyor sections C13b onto conveyor section C3d, the lateral removal of the keg from conveyor sections C13b results in the return of photocell contact PC28b to its normally open position for deenergizing solenoid valve SV47. However, limit switch 20 is opened in response to movement of pusher 83 away from its retracted position so that clamps 85a and 85b remain in their closed positions to arrest the keg next in line on conveyor section C13d. Upon the return of pusher 83 from its extended position to its retracted or inoperative position, limit switch LS20 is closed by switch actuator 96 to complete the circuit for energizing solenoid valve SV48 and thereby return clamps 85a and 85b to their open or inoperative positions for permitting the previously arrested keg to move further on conveyor section C13b to the location of pusher 83.

As shown on FIG. 11, the circuit for energizing solenoid valve SV49 includes parallel manually actuated selector switches SS5b and SS6b, normally open switches constituted by photocells PC29, PC30 and PC31, and a normally closed switch constituted by a photocell PC32. As indicated, selector switches SS5a and SS5b are mechanically connected so as to be alternately closed and opened, whereas selector switches SS6a and SS6b are mechanically connected so as to be simultaneously opened or closed.

As shown on FIG. 10, photocells PC29 and PC30 are located adjacent distributing device 82 so that light beams directed thereat by light sources (not shown) will be interrupted by the opposite end portions of a keg transported on conveyor section C3d to the location of pusher 93. Photocell PC31 is located downstream from photocell PC29 by a distance which is greater than the length of a keg, but less than the normal spacing between kegs carried by conveyor section C3d. Thus, a light beam aimed at photocell PC31 from a light source PL31 laterally across conveyor section C3d is interrupted by a keg to close the switch constituted by photocell PC31 simultaneously with the closing of the switches constituted by photocells PC29 and PC30, only if the kegs on conveyor section C3d have been backed-up from the location of keg feeder KF1. Further, as shown on FIG. 10, photocell PC32 has a beam of light aimed thereat by a light source PL32 diagonally across that portion of conveyor section C13b which is opposite pusher 93.

By reason of the above described arrangement, solenoid valve SV49 is energized to cause movement of pusher 93 to its extended or operative position for transferring a keg from conveyor section C3d onto conveyor section C13b only if there is a space available on conveyor section C13b to receive the transferred keg and sufficient kegs are backed-up on conveyor section C3d at the downstream side of distributing device 82 to ensure a continuing adequate supply of kegs for feeding to inlet 10a of the main washing apparatus by keg feeder KF1.

The energizing circuit for solenoid valve SV50 is shown to include a normally open limit switch LS22 which is mounted so as to be engaged by a switch actuator 97 (FIG. 10) or otherwise closed in response to movement of pusher 93 to its operative or extended position. Thus, upon movement of pusher 93 to its extended position, closing of limit switch LS22 causes energizing of solenoid valve SV50 which in turn causes return movement of pusher 93 to its inoperative or retracted position. Further, upon movement of pusher 93 to its operative or extended position to transfer a keg from conveyor section C3d to conveyor section C13b, the switches constituted by photocells PC29 and PC30 are returned to their open positions and the switch constituted by the photocell PC32 is opened, thereby to deenergize solenoid valve SV49.

The circuit for energizing solenoid valve SV51 is shown to include a normally open photocell switch contact PC33a, while the circuit for energizing solenoid valve SV52 is shown to include a normally closed photocell switch contact 33b, a normally open limit switch LS23 and a normally closed limit switch LS24 in series therein (FIG. 11). As shown on FIG. 10, the photocell PC33 having the contacts PC33a and PC33b is mounted so that a light beam directed at such photocell by a light source (not shown) will be intercepted by the leading end of a keg transported on conveyor section C3d to the location of pusher 93. Further, limit switch LS23 is mounted so as to be engaged by actuator 97 or otherwise closed upon movement of pusher 93 to its retracted or inoperative position, whereas limit switch LS24 is mounted so as to be engaged by one of clamps 95a and 95b or otherwise opened in response to movement of the clamps to their open or inoperative positions, as shown.

By reason of the foregoing arrangement, solenoid valve SV51 is energized to move clamps 95a and 95b to their closed position whenever a keg transported by conveyor section C3d has moved past the clamps and has its leading end detected by photocell PC33. If the keg continues on conveyor section C3d past pusher 93, and thus is no longer detected by photocell PC33 while keg pusher 93 remains in its retracted or inoperative position, photocell contact PC33b returns to its normally closed position and limit switch LS23 is held in its closed position by actuator 97 so that solenoid valve SV52 is energized to cause opening of clamps 95a and 95b and thus permit the keg next in line on conveyor section C3d to move past the clamps to the location of keg pusher 93. On the other hand, if a keg arriving at the location of pusher 93 and causing closing of clamps 95a and 95b thereafter is transferred by pusher 93 from conveyor section C3d onto conveyor section C13b, the lateral movement of the keg away from photocell PC33 does not result in immediate return of the clamps to their open position, as the movement of the pusher 93 to its extended or operative position is accompanied by opening of limit switch LS23 in the energizing circuit for solenoid valve SV52. Thus, clamps 95a and 95b remain closed to arrest the keg next in line on conveyor section C3d until keg pusher 93 is returned to its retracted or inoperative position to close limit switch LS23.

The coupled together manually actuated selector switches SS5a and SS5b and the coupled together manually actuated selector switches SS6a and SS6b make it possible to selectively vary the sources of the kegs fed to the keg washing apparatus 10 and to the keg washing apparatus 11. When switches SS6a and SS6b are both open and switches SS5a and SS5b are disposed as shown on FIG. 11, that is, with switch SS5b in closed position, keg pusher 83 remains inoperative under all circumstances and kegs removed from storage and deposited on auxiliary conveyor C13 by downending devices 62, 63 and 64 continue along terminal section C13b of the auxiliary conveyor to keg feeder KF2. If the keg feeder KF2, which may be manually controlled, feeds kegs to inlet 11a of auxiliary washing apparatus 11 at a rate less than that at which kegs are transported by terminal conveyor section C13b to its terminus, or if keg washing apparatus 11 is not being utilized so that keg feeder KF2 is inoperative, the backing up of kegs on conveyor section C13b beyond the location of photocell PC24 causes stoppage of auxiliary conveyor C13, and, in consequence thereof, the operation of downending devices 62, 63 and 64 and of conveyors C7, C8 and C9 and conveyors C10, C11 and C12 in the degrouping zone Z4 is also halted, as described above.

Further, when only selector switch SS5b is in the closed position, as shown, all of the kegs fed to inlet 10a of the main washing apparatus by keg feeder KF1, which may be automatically controlled in synchronism with the automatic operation of main washing apparatus 10, are kegs that have been returned at docks 12 and transported therefrom on conveyors C1, C2 and C3. If the rate of which keg feeder KF1 effects removal of kegs from the terminus of main conveyor C3 is at least as great as the rate at which kegs are conveyed toward the keg feeder KF1 along terminal conveyor section C3d, so that there is no back-up of kegs along the portion of conveyor section C3d which is downstream with respect to keg distributing device 82, then pusher 93, and also keg removing devices 28, 29 and 30, remain inoperative and all of the kegs returned to the brewery are fed to the main washing apparatus.

However, if the rate at which kegs are removed by keg feeder KF1 is less than the rate at which kegs are advanced along conveyor section C3d to the terminus of the main conveyor so that kegs back up on conveyor section C3d to the location of keg distributing device 82, the simultaneous detection of kegs by photocells PC29 and PC31 causes pusher 93 to transfer successive kegs from conveyor section C3d onto conveyor section C13b so long as there is space available on conveyor section C13b to receive the transferred kegs. Such space on conveyor section C13b to receive kegs transferred thereto by distributing device 82 may appear between the spaced apart kegs transported by auxiliary conveyor C13 from degrouping zone Z4. Alternatively, the space to receive transferred kegs may be made available on conveyor section C13b by opening manually actuated switches SS2 and SS3 (FIG. 9) in the energizing circuits for motors MC7, 8, 9 and MC10, 11, 12, thereby to halt operation of the conveyors in the degrouping zone, and thus to halt the degrouping of kegs removed from storage and their deposit on auxiliary conveyor C13.

If the operation of keg feeder KF2 is halted, or if the rate at which keg feeder KF2 removes kegs from the terminus of conveyor section C13b is less than the rate at which kegs are advanced to such terminus, the resulting backing up of kegs on conveyor section C13b will be detected by photocell PC32 to prevent further operation of keg pusher 93 in transferring kegs from conveyor section C3d to conveyor section C13b. When the foregoing occurs, and the rate at which kegs are advanced along terminal conveyor section C3d toward its terminus is still greater than the rate at which keg feeder KF1 removes kegs from such terminus, the backing up of kegs on conveyor section C3d will eventually extend to the location of photocell PC8 and thereby initiate the removal of kegs from the main conveyor at zone Z2, as described above.

If main washing apparatus 10 and its associated keg feeder KF1 are inoperative and keg feeder KF2 is operated to feed kegs to the auxiliary washing apparatus 11 at a time when only selector switch SS5b is in its closed position, as shown on FIG. 11, kegs transported on conveyor section C3d will back-up to the location of distributing device 82 and cause all of the kegs subsequently transported along conveyor section C3d to be transferred by pusher 93 onto conveyor section C13b for further transport by the latter to keg feeder KF2. In the latter case, if the rate at which kegs are advanced along conveyor section C3d for transfer to conveyor section C13b is greater than the rate at which kegs are removed from the terminus of the latter by keg feeder KF2, then the resulting backing-up of kegs on conveyor section C13b to the location of photocell PC32 will halt operation of keg pusher 93 and, thereafter, the further backing-up of kegs on conveyor section C3d to the location of photocell PC8 will initiate the removal of kegs from the main conveyor at zone Z2.

If switches SS6a and SS6b remain in their open positions, as shown on FIG. 11, the switches SS5a and SS5b are manipulated to close the former and open the latter, then pusher 93 is inoperative under all circumstances, and kegs can be transferred only in the direction from conveyor section C13b to conveyor section C3d. With only the switch SS5b in closed position, kegs removed from storage and transported on auxiliary conveyor C13, will continue along terminal conveyor section C13b past pusher 83 to keg feeder KF2 at its terminus so long as such keg feeder removes kegs from conveyor section C13b at a rate which is at least as great as that at which the kegs are advanced to the keg feeder. However, if keg feeder KF2 is inoperative or removes kegs from conveyor section C13b at a slower rate than that at which kegs are advanced to the terminus of conveyor section C13b, the resulting backing up of kegs on the latter beyond the location of photocell PC25 will cause pusher 83 to transfer the subsequently conveyed kegs from conveyor section C13b to conveyor section C3d so long as there is space on the latter to receive the transferred kegs. If keg feeder KF1 removes kegs from the terminus of conveyor section C3d at a rate that is less than that at which kegs are advanced to the terminus of conveyor section C3d, the resulting backing up of kegs on conveyor section C3d beyond the location of photocell PC27 will prevent further operation of pusher 83, and thereby cause backing-up of kegs on conveyor section C13b beyond the location of photocell PC24 to halt operation of auxiliary conveyor C13 and to prevent further operation of the conveyors and downending devices at degrouping zone Z4.

With only selector switch SS5a in its closed position, the described keg handling system can be operated to cause kegs removed from storage to be fed only to inlet 10a of the main washing apparatus by way of keg distributing device 81, as when keg feeder KF2 is inoperative. In that case, the kegs removed from storage may constitute the sole supply of kegs for the main washing apparatus or may supplement the returned empty kegs being fed to the latter by way of the keg receiving conveyors C1 and C2 and the main conveyor C3. However, if both the keg feeders KF1 and KF2 are operated, so that the kegs removed from storage are to be supplied to the inlets of both main washing apparatus 10 and auxiliary washing apparatus 11, keg feeder KF2 is preferably operated at a sufficiently slow speed to cause backing-up of kegs along conveyor section C13b, and thereby to give preference to the maintenance of an adequate supply of kegs on conveyor section C3d for feeding to the main washing apparatus, as will be apparent from the above description.

When the manually actuated selector switches SS6a and SS6b are simultaneously closed, both pushers 83 and 93 are rendered operative to transfer kegs between conveyor sections C3d and C13b so as to maintain adequate supplies of kegs to be fed to washing apparatus 10 and to washing apparatus 11, but with preference being given to the maintenance of an adequate supply of kegs to be fed to main washing apparatus 10. Thus, so long as an adequate supply of kegs is backed-up along conveyor section C3d beyond the location of photocell PC31, the presence of an empty space on conveyor section C13b, as detected by photocell PC32 will result in feeder 93 being operated to transfer kegs from conveyor section C3d to conveyor section C13b for feeding to the inlet of auxiliary washing apparatus 11. On the other hand, if kegs are backed-up on conveyor section C13b beyond the location of photocell PC25 and the kegs on conveyor section C3d are not backed-up beyond the location of photocell PC27, then pusher 83 will be operated to transfer the kegs removed from storage from conveyor section C13b onto conveyor section C3d for augmenting or increasing the supply of kegs held in readiness on the latter for feeding to the main washing apparatus 10. Once again, operation of pusher 83, as indicated above, to augment or increase the supply of kegs held in readiness on conveyor section C3d for feeding to the main washing apparatus can be achieved merely by providing a relatively slow rate of operation of keg feeder KF2.

From the above, it will be obvious that manipulation of selector switches SS5a and SS5b and of selector switches SS6a and SS6b makes it possible to vary the conditions of the feeding of kegs to washing apparatus 10 and washing apparatus 11 so as to satisfy the demands therefor, and particularly to permit continuous operation of main washing apparatus 10 at its optimum rate.

It is further to be noted that the above described keg handling system provides considerable flexibility in supplying kegs to each keg washing apparatus either from the trucks or other conveyances returning the kegs to the brewery or from storage, and that such flexibility is achieved in a substantially automatic fashion and with minimum manual handling of the kegs.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:

1. In a brewery having a plurality of unloading stations at which empty beer kegs are returned to the brewery and washing apparatus for cleaning the empty kegs prior to the racking thereof, a system for handling the kegs comprising conveyor means moving past said unloading stations for receiving the returned empty kegs and having a terminus adjacent the washing apparatus toward which kegs on said conveyor means are transported for feeding to said apparatus, means operative when there is a predetermined excess of kegs on a section of said conveyor means leading to said terminus to effect removal of kegs from said conveyor means in advance of said section, grouping means receiving said kegs removed from said conveyor means and accumulating said removed kegs in predetermined convenient groupings for storage thereof, degrouping means for receiving said groupings of kegs from storage and being operable to separate kegs from said groupings, an auxiliary conveyor receiving the separated kegs from said degrouping means and conveying such kegs in succession, keg distributing means operative to transfer successive kegs from said auxiliary conveyor to said section of the conveyor means, and control means for said keg distributing means actuatable to cause operation of the latter when there is less than said predetermined excess of kegs on said section of the conveyor means, thereby to continuously maintain an adequate supply of empty kegs on said section for feeding to the washing apparatus.

2. A keg handling system according to claim 1; wherein the kegs are disposed in prone positions on said conveyor means, and further wherein said grouping means includes upending means operative to dispose the kegs removed from said conveyor means in erect positions for the accumulation thereof in said groupings, and said degrouping means includes downending means operative on the kegs separated from said groupings to return said kegs from said erect positions to said prone positions on said auxiliary conveyor.

3. A keg handling system according to claim 1; further comprising a second keg washing apparatus to which said auxiliary conveyor extends for supplying kegs thereto, second keg distributing means operative to transfer kegs from said section of the conveyor means to said auxiliary conveyor, and control means for said second keg distributing means actuatable to effect operation of the latter when more than an adequate supply of kegs for the first mentioned washing apparatus is present on said section of the conveyor means and there is an inadequate supply of kegs for said second washing apparatus on said auxiliary conveyor.

4. A keg handling system according to claim 3; further comprising selector means settable to permit actuation of said control means for both of said keg distributing means, to permit actuation of only said control means for the first mentioned keg distributing means, and to permit actuation of only said control means of said second keg distributing means.

5. A keg handling system according to claim 1; wherein said auxiliary conveyor has a section thereof parallel to said section of the conveyor means and at which said keg distributing means is located, and said control means includes keg detecting means preventing operation of said keg distributing means when a keg is present on said section of the conveyor means opposite said keg distributing means.

6. A keg handling system according to claim 5; wherein said control means further includes second keg detecting means preventing operation of said keg distributing means when a keg is being transported by said conveyor means beyond said means for effecting removal of kegs therefrom.

7. A keg handling system according to claim 1; wherein said conveyor means includes a plurality of keg receiving conveyors each moving past a plurality of said unloading stations for receiving empty kegs returned at the respective stations, said keg receiving conveyors having substantially parallel adjacent terminal sections toward which the kegs on said receiving conveyors are transported, a main conveyor extending from between said terminal sections of the keg receiving conveyors and including said section leading to said terminus adjacent the washing apparatus, and transfer means operative to transfer kegs alternatively from said terminal sections of the keg receiving conveyors onto said main conveyor with at least a predetermined spacing between the successive kegs transferred to said main conveyor.

8. A keg handling system according to claim 7; wherein said transfer means includes, for each of said keg receiving conveyors, keg pushing means operative to laterally push the first keg in line on said terminal section of the related receiving conveyor from the latter onto said main conveyor and keg stop means disposed in advance of said keg pushing means and being operative to halt the movement of the second keg in line on the related receiving conveyor, control means effecting operation of said keg stop means of each receiving conveyor only when the keg first in line on the respective receiving conveyor is moving from said keg stop means to the related keg pushing means and the second keg in line arrives at said keg stop means, control means effecting operation of said keg pushing means of one receiving conveyor only when the keg first in line on the latter arrives at said keg pushing means and there is a predetermined free space on said main conveyor, and control means effecting operation of said keg pushing means of the other receiving conveyor only when the keg first in line on the latter arrives at said keg pushing means and, simultaneously, the keg first in line on said other receiving conveyor is moving from the associated keg stop means to the associated keg pushing means and there is said predetermined free space on said main conveyor.

9. A keg handling system according to claim 7; wherein said means to effect removal of kegs from the conveyor means includes keg pushing means disposed adjacent said main conveyor in advance of said section of the latter and being operative to push kegs laterally off said main conveyor, keg detecting means disposed adjacent said section of the main conveyor at a location remote from said terminus, said keg detecting means being actuated intemittently by spaced apart kegs passing said location and being actuated continuously when the rate at which kegs are fed from said terminus to the washing apparatus is less than the rate at which kegs are transported to said section so as to cause closing of the spaces between successive kegs on said section back to the location of said detecting means, and control means effecting operation of said keg pushing means in response to continuous actuation of said keg detecting means for at least a predetermined period.

10. A keg handling system according to claim 1; wherein said conveyor means has means operative to space apart by at least a predetermined distance the kegs transported thereby in advance of said section of the conveyor means, and means at said terminus operative periodically to feed the keg first in line on said section to the washing apparatus; and wherein said means to effect removal of kegs from the conveyor means includes keg pushing means disposed in advance of said section and operative to push kegs laterally off said conveyor means, keg detecting means at a location adjacent said section which is in advance of said terminus, said detecting means being actuated intermittently by spaced apart kegs passing said location and being actuated continuously when the rate at which kegs are periodically fed from said terminus to the washing apparatus is less than the rate at which kegs are transported on said section to said terminus so as to cause closing of the spaces between the kegs on said section back to said location of the detecting means, and control means effecting operation of said keg pushing means in response to said continuous actuation of said keg detecting means for a predetermined period.

11. A keg handling system according to claim 1; wherein said conveyor means includes first and second keg receiving conveyors respectively moving past a relatively larger number and a relatively smaller number of said unloading stations for receiving empty kegs returned at the respective stations, said keg receiving conveyors having substantially parallel adjacent terminal sections toward which the kegs on said receiving conveyors are transported, a main conveyor extending from between said terminal sections of the keg receiving conveyors to said terminus adjacent the washing apparatus, first and second keg transfer means located adjacent said terminal sections of said first and second keg receiving conveyors, respectively, and being operative alternatively to transfer to said main conveyor kegs which are first in line on the respective keg receiving conveyors and which have reached the locations of said transfer means, and control means for said second keg transfer means permitting operation thereof only when a keg first in line on said first keg receiving conveyor is moving toward said first transfer means, thereby to give preference to the transfer to said main conveyor of kegs from said first keg receiving conveyor.

12. A keg handling system according to claim 1; further comprising means operative in response to jamming at said grouping means of kegs removed from said conveyor means to halt the transport by the latter of kegs to said means for effecting removal of kegs from the conveyor means.

13. A keg handling system according to claim 1; wherein said conveyor means comprises a main conveyor which includes said section and means to transfer the returned empty kegs onto said main conveyor with at least a predetermined distance therebetween, said auxiliary conveyor includes a section running parallel to said section of the main conveyor and leading to a second keg washing apparatus, said degrouping means deposits the separated kegs on said auxiliary conveyor in advance of said section of the latter and with at least a predetermined distance between successive kegs, said keg distributing means is disposed adjacent the beginning of said section of the auxiliary conveyor, and said control means includes detecting means to sense the presence of a clear space on the portion of said section of the main conveyor opposite said keg distributing means and to sense the closing together of the kegs on said section of the auxiliary conveyor downstream from said distributing means as simultaneous preconditions to operation of said distributing means for transferring a keg from said auxiliary conveyor to said main conveyor.

14. A keg handling system according to claim 13; further comprising means to halt operation of said auxiliary conveyor in response to closing together of the kegs thereon upstream beyond said distributing means, and means to halt operation of said degrouping means in response to halting of the operation of said auxiliary conveyor.

15. A keg handling system according to claim 13; wherein said means to effect removal of kegs from the conveyor means includes keg pushing means disposed adjacent said main conveyor in advance to said section of the latter and being operative to push kegs laterally off said main conveyor, detecting means to sense the closing together of the kegs on said section of the main conveyor at a location upstream beyond the portion of the latter opposite said distributing means and control means effecting operation of said keg pushing means when the last mentioned detecting means senses said closing together of the kegs at said location.

16. A keg handling system according to claim 13; further comprising a second keg distributing means disposed adjacent said section of the main conveyor at a location intermediate said terminus and the portion of said main conveyor opposite the first mentioned keg distributing means, said second distributing means being operative to transfer kegs from said section of the main conveyor to said section of the auxiliary conveyor, and control means for effecting operation of said second distributing means including detecting means to sense the presence of a clear space on the portion of said section of the auxiliary conveyor opposite said second distributing means and to sense the closing together of the kegs on said section of the main conveyor downstream from said second distributing means as simultaneous preconditions for operation of the latter.

17. A key handling system according to claim 16; further comprising selector means actuatable to selectively permit operation of both said first and second distributing means, operation of only said first distributing means, and operation of only said second distributing means.

18. In a brewery having a plurality of unloading stations at which empty beer kegs are returned to the brewery and washing apparatus for cleaning the empty kegs prior to the racking thereof, a system for handling the kegs comprising conveyor means moving past said unloading stations to receive the returned empty kegs in prone positions on said conveyor means and terminating adjacent the washing apparatus toward which kegs on said conveyor means are transported for feeding to said apparatus, means operative when there is a predetermined excess of kegs on a section of said conveyor means leading to the washing apparatus to effect removal of kegs from said conveyor means in advance of said section, upending means receiving kegs removed from said conveyor means in prone positions and being operative to dispose the removed kegs in erect positions, grouping means receiving the erect kegs from said upending means and accumulating the erect kegs in predetermined convenient groupings for storage thereof, and degrouping means for receiving said groupings of erect kegs from storage and being operable to separate kegs from said groupings, to dispose the kegs in prone positions and to return the kegs in prone positions to said conveyor means, thereby to maintain a substantially continuously adequate supply of empty kegs on said conveyor means for transport to the washing apparatus.

References Cited

UNITED STATES PATENTS

| 3,027,023 | 3/1962 | McGrath | 214—16 |
| 3,093,252 | 6/1963 | Cahill | 214—16 |

ROBERT G. SHERIDAN, *Primary Examiner.*